(12) United States Patent
Essawi et al.

(10) Patent No.: US 8,510,263 B2
(45) Date of Patent: Aug. 13, 2013

(54) METHOD AND SYSTEM FOR AUDITING TRANSACTION DATA FROM DATABASE OPERATIONS

(75) Inventors: Tarik R. Essawi, Leesburg, VA (US); Nageswararao Chigurupati, Clifton, VA (US)

(73) Assignee: Verisign, Inc., Reston, VA (US)

( * ) Notice: Subject to any disclaimer, the term of this patent is extended or adjusted under 35 U.S.C. 154(b) by 146 days.

(21) Appl. No.: 12/484,978

(22) Filed: Jun. 15, 2009

(65) Prior Publication Data

US 2010/0318858 A1    Dec. 16, 2010

(51) Int. Cl.
G06F 17/30 (2006.01)
G06F 17/00 (2006.01)

(52) U.S. Cl.
USPC .......................................... 707/607; 707/703

(58) Field of Classification Search
USPC .................................. 707/607, 703
See application file for complete search history.

(56) References Cited

U.S. PATENT DOCUMENTS

| | | | |
|---|---|---|---|
| 6,643,652 B2 | 11/2003 | Helgeson et al. | |
| 7,280,999 B2 | 10/2007 | Chung et al. | |
| 7,310,686 B2 | 12/2007 | Uysal | |
| 7,546,368 B2 | 6/2009 | Drees et al. | |
| 7,631,101 B2 | 12/2009 | Sullivan et al. | |
| 7,685,270 B1 | 3/2010 | Vermeulen et al. | |
| 7,694,016 B2 | 4/2010 | Halley | |
| 7,725,602 B2 | 5/2010 | Liu et al. | |
| 7,734,815 B2 | 6/2010 | Leighton et al. | |
| 7,761,570 B1 | 7/2010 | Halley | |
| 7,769,826 B2 | 8/2010 | Gustafsson | |
| 7,814,202 B2 | 10/2010 | Drees et al. | |
| 7,925,747 B2 | 4/2011 | Kirwan et al. | |
| 7,925,782 B2 | 4/2011 | Sivasubramanian et al. | |
| 7,930,393 B1 | 4/2011 | Baumback et al. | |
| 7,933,951 B2 | 4/2011 | Sullivan et al. | |
| 2002/0116205 A1* | 8/2002 | Ankireddipally et al. | 705/1 |
| 2003/0084057 A1 | 5/2003 | Balogh | |

(Continued)

FOREIGN PATENT DOCUMENTS

| | | |
|---|---|---|
| WO | 0065511 A2 | 11/2000 |
| WO | 2005069823 A2 | 8/2005 |
| WO | 2010147894 A1 | 12/2010 |

OTHER PUBLICATIONS

International Search Report and Written Opinion of PCT Application No. PCT/US2010/037715, mailed Aug. 6, 2010, 7 pages total.

(Continued)

*Primary Examiner* — Jacob F Bétit
*Assistant Examiner* — John P Hocker
(74) *Attorney, Agent, or Firm* — MH2 Technology Law Group, LLP

(57) ABSTRACT

A method for validating SRS registry transaction data includes receiving OLTP transaction data from a first database, parsing the OLTP transaction data, and comparing the parsed OLTP transaction data to one or more of a set of profiles. Each of the one or more of the set of profiles includes metadata in XML files. The method also includes caching the parsed OLTP transaction data in a first data cache, receiving log data associated with the OLTP transaction data; and caching the log data in a second data cache. The method further includes correlating the parsed transaction data cached in the first data cache with the log data cached in the second data cache.

17 Claims, 16 Drawing Sheets

(56) References Cited

U.S. PATENT DOCUMENTS

| | | |
|---|---|---|
| 2003/0084074 A1 | 5/2003 | Balogh et al. |
| 2003/0084075 A1 | 5/2003 | Balogh et al. |
| 2004/0039798 A1 | 2/2004 | Hotz et al. |
| 2004/0215695 A1 | 10/2004 | Hsu et al. |
| 2004/0254926 A1 | 12/2004 | Balogh |
| 2005/0027882 A1 | 2/2005 | Sullivan et al. |
| 2005/0097149 A1* | 5/2005 | Vaitzblit et al. ............... 707/202 |
| 2005/0105513 A1 | 5/2005 | Sullivan et al. |
| 2005/0209876 A1 | 9/2005 | Kennis et al. |
| 2005/0240531 A1 | 10/2005 | Wolff, Jr. |
| 2006/0294057 A1 | 12/2006 | Childress et al. |
| 2007/0070820 A1 | 3/2007 | Gallant |
| 2007/0100808 A1 | 5/2007 | Balogh |
| 2007/0294419 A1 | 12/2007 | Ulevitch |
| 2008/0059152 A1 | 3/2008 | Fridman et al. |
| 2008/0071909 A1 | 3/2008 | Young et al. |
| 2008/0133729 A1 | 6/2008 | Fridman et al. |
| 2008/0147559 A1 | 6/2008 | Cohen et al. |
| 2008/0155254 A1 | 6/2008 | Stradling |
| 2008/0201390 A1 | 8/2008 | Anguelov |
| 2008/0201413 A1 | 8/2008 | Sullivan et al. |
| 2009/0106211 A1 | 4/2009 | Balogh |
| 2009/0106390 A1 | 4/2009 | Kirwan, Jr. et al. |
| 2009/0157889 A1 | 6/2009 | Treuhaft |
| 2009/0235359 A1 | 9/2009 | Abdulhayoglu et al. |
| 2009/0282027 A1 | 11/2009 | Subotin et al. |
| 2009/0282028 A1 | 11/2009 | Subotin et al. |
| 2009/0282038 A1 | 11/2009 | Subotin et al. |
| 2010/0030897 A1 | 2/2010 | Stradling |
| 2010/0077462 A1 | 3/2010 | Joffe et al. |
| 2010/0138559 A1 | 6/2010 | Sullivan et al. |
| 2010/0218040 A1 | 8/2010 | Bodmer et al. |
| 2010/0257266 A1 | 10/2010 | Holmes et al. |
| 2010/0274836 A1 | 10/2010 | Orentas et al. |
| 2010/0274970 A1 | 10/2010 | Treuhaft et al. |
| 2010/0287532 A1 | 11/2010 | Smith et al. |
| 2010/0318858 A1 | 12/2010 | Essawi et al. |
| 2011/0022678 A1 | 1/2011 | Smith et al. |
| 2011/0029662 A1 | 2/2011 | Drees et al. |
| 2011/0035469 A1 | 2/2011 | Smith et al. |
| 2011/0035497 A1 | 2/2011 | Daly et al. |
| 2011/0047292 A1 | 2/2011 | Gould et al. |
| 2011/0051728 A1 | 3/2011 | Bhogavilli et al. |
| 2011/0106891 A1 | 5/2011 | Gallant et al. |
| 2011/0110267 A1 | 5/2011 | Gallant |
| 2011/0161289 A1 | 6/2011 | Pei et al. |

OTHER PUBLICATIONS

Anthony M. Rutkowski, "Proposal and text for X.spidreq—Requirements and use cases for a global trusted service provider identity", ITU-T Drafts; Study Period 2005-2008, International Telecommunication Union, Geneva; CH, vol. Study Group 17; 6/17, Mar. 1, 2008, pp. 1-27.

Andrew McMillan et al., "Shared Registry System—Technical Architecture", Version 1.2, May 23, 2002, 56 pages. http://dnc.org.nz/content/srs_tech_architecture-v1.2.pdf, accessed Dec. 4, 2012.

"Extended European Search Report", dated Dec. 12, 2012, for EP Application No. 10789942.9, filed Jun. 8, 2010, 9 pages, published by the EPO on their website.

* cited by examiner

METHOD AND SYSTEM FOR AUDITING TRANSACTION DATA FROM DATABASE OPERATIONS

BACKGROUND OF THE INVENTION

The internet is an increasingly international network of computers that supports various forms and levels of communication. For instance, on the world wide web (WWW), information can be presented on universally available pages commonly known as websites. The internet also supports one-on-one communication between end-users via electronic email and/or internet bulletin board services. The common denominator in every form of communication over the internet, however, is the use of domain names to identify the computer to be contacted. The domain name, which is referred to as an internet protocol (IP) number, is actually a unique combination of numbers separated by decimal points.

Because IP numbers can be cumbersome and difficult for internet users to remember or use, the IP numbering system has been overlaid with the more user-friendly domain name system. This system allows internet addresses to be assigned an alphanumeric designation or domain name, which directly correlates to the assigned IP number. Special computers known as domain name servers maintain tables linking domain names to their respective IP numbers.

The anatomy of a domain name consists of more than two parts, called domain levels, separated by a period (referred to as a dot). The Top-Level-Domain level (TLD), which is referred to by its internet zone designation, ".com," or ".gov.," ".uk,", etc., is found to the right of the dot. TLDs which represent a specific country are referred to as Country-Code TLDs, or ccTLDs. The Second-Level-Domain (SLD) or Third Level Domain, which is commonly referred to as the domain name, consists of characters (including letters, numbers, and hyphens) located immediately to the left of the dot.

For the domain name address system to operate properly, each domain name within a particular TLD must be unique, even if it differs from another domain name by only one character. In order to prevent duplicate "domain names" from being assigned, a single entity, commonly referred to as a registry, is ultimately responsible for maintaining a complete database of all of the domain names in each particular TLD. This database is referred to as a registry database. In the majority of generic (e.g., .com, .net, .org) domain name registrations, there is little or no human intervention in the registration process. The registry database maintained by the registry electronically records the assigned relationship between the more easily remembered domain name and its corresponding IP number (received from an international entity tasked with assigning all IP numbers) and reports this information to the TLD registry for recordation in the master database of all domain names. The registrar also enters into a registration agreement (contract) with each registrant, and records and maintains vital registrant contact and billing information.

Due to the vital role domain names play in internet communication, the easy, immediate, secure, and dependable registration and maintenance of domain names is necessary to the continued rapid growth of the internet. Thus, there is a need in the art for improved methods and systems related to auditing and validation of transactions associated with registry databases.

SUMMARY OF THE INVENTION

The present invention relates generally to database systems. More specifically, the present invention relates to methods and systems for auditing transactions performed in a registry database. Merely by way of example, the invention has been applied to a system that validates transaction data using profiles describing registry operations and compares the validated transaction data to transaction log files. The methods and techniques can be applied to other high value database systems to verify data integrity.

According to an embodiment of the present invention, a method for validating SRS registry transaction data is provided. The method includes receiving OLTP transaction data from a first database, parsing the OLTP transaction data, and comparing the parsed OLTP transaction data to one or more of a set of profiles. Each of the one or more of the set of profiles comprises metadata in XML files. The method also includes caching the parsed OLTP transaction data in a first data cache and receiving log data associated with the OLTP transaction data. The method further includes caching the log data in a second data cache and correlating the parsed transaction data cached in the first data cache with the log data cached in the second data cache.

According to another embodiment of the present invention, a method for validating transaction data is provided. The method includes receiving the transaction data from a first database and parsing the transaction data. The method also includes comparing the parsed transaction data to one or more of a set of profiles and receiving log data associated with the transaction data. The method further includes correlating the parsed transaction data with the log data.

According to a specific embodiment of the present invention, a system for validating transaction data associated with an SRS registry database with transaction log files stored in a transaction log database is provided. The system includes a database reader operable to receive OLTP transaction data from the SRS registry database and parse the OLTP transaction data and a database data validator coupled to the database reader and operable to compare the parsed OLTP transaction data with one or more of a set of profiles. The system also includes a transaction log file reader operable to receive transaction log files from the transaction log database and a data correlator coupled to the database data validator and the transaction log file reader and operable to correlate the parsed transaction data with the transaction log files.

According to another specific embodiment of the present invention, a computer-readable medium storing a plurality of instructions for controlling a data processor to validate transaction data is provided. The plurality of instructions includes instructions that cause the data processor to receive the transaction data from a first database and instructions that cause the data processor to parse the transaction data. The plurality of instructions also includes instructions that cause the data processor to compare the parsed transaction data to one or more of a set of profiles and instructions that cause the data processor to receive log data associated with the transaction data. The plurality of instructions further includes instructions that cause the data processor to correlate the parsed transaction data with the log data.

Many benefits are achieved by way of the present invention over conventional techniques. For example, embodiments of the present invention provide operations staff with alerts when any changes to the SRS registry database are performed outside of known applications. Thus, information related to malicious activity associated with the registry database is provided by the embodiments described herein. Moreover, embodiments of the present invention provide registry database operators with a competitive advantage over business competitors since validation of registry data enhances the integrity of the data. By utilizing the methods and systems described herein, system operators are able to detect intruders and malicious activity more easily and quickly, thereby limiting potential damage to the registry database. Furthermore, utilizing embodiments of the present invention, operations staff are able to identify the origin of every transaction that manipulates data within the database, thus, the security auditor establishes a chain of trust between the application and database. Additionally, embodiments of the present invention ensure that every transaction committed to the database comes from a know source. These and other embodiments of the invention along with many of its advantages and features are described in more detail in conjunction with the text below and attached figures.

DETAILED DESCRIPTION OF SPECIFIC EMBODIMENTS

Figure 1:
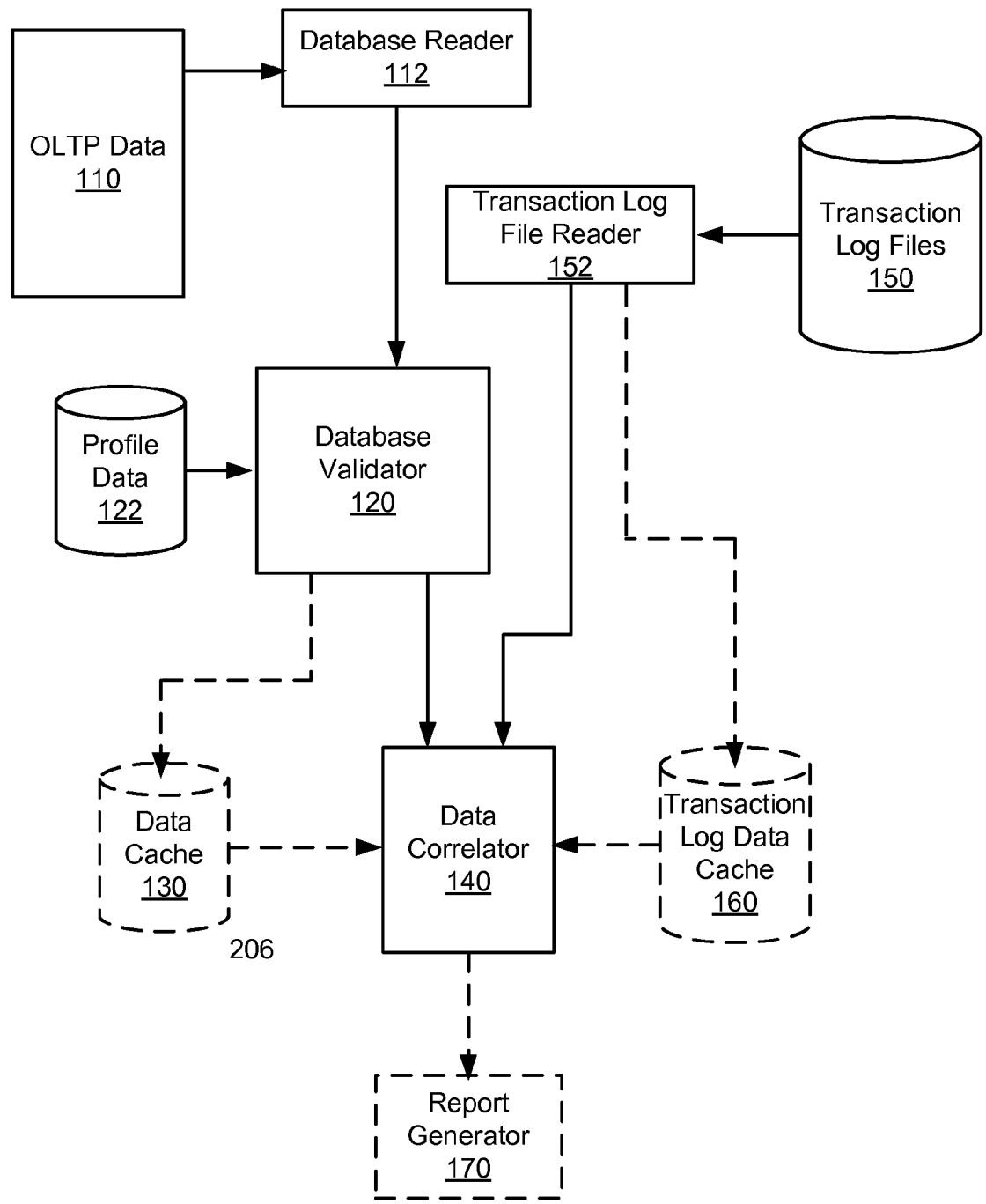
FIG. 1 is a simplified block diagram of a system for validating transaction data according to an embodiment of the present invention.

FIG. 1 is a simplified block diagram of a system for validating transaction data according to an embodiment of the present invention. The system and method described herein audit the database (e.g., the SRS registry database) to ensure that all changes to the data have come from a known source, that the chain of custody between the customer and data can be verified and audited, that the intent of the customer transaction was correctly persisted in the database, that business rules are being properly enforced, and to quickly identify and alert system operators of malicious behavior related to the database.

The system includes the registry database 110, which includes online transaction processing (OLTP) data. Embodiments of the present invention are applicable to other databases, but OLTP data is discussed herein as a representative data source. A database reader 112 is utilized to pull data from the database 110 and send the data to the database validator 120. The database reader 112 will typically parse the data, for example, the OLTP data. The database validator 120 receives profile data from profile database 122 and validates the data from the database reader against one or more matching profiles from the profile database. As an example, if data related to an Add Domain operation is present in the OLTP data, then the database validator 120 can compare this OLTP data against an Add Domain profile to determine if the correct database operations were performed as part of the Add Domain operation. Additional discussion related to validating data using profiles is provided throughout the present specification and more particularly below. After validation, data can be cached in data cache 130.

The system also includes a transaction log file reader 152 that receives data from transaction log files 150. The transaction log data can be cached in a transaction log data cache 160 or passed directly to the data correlator 140. As shown in FIG. 1, the data correlator 140 receives inputs from the database validator 120, the transaction log file reader 152, and/or the data cache 130 and the transaction log data cache 160. The data correlator 140 compares the validated data from the database validator and the transaction log data to determine if there is consistency between these two data sources. Additional discussion related to correlation of these data sources is provided throughout the present specification and more particularly below. An optional report generator 170 receives the results of the data correlation process and is adapted to provide reports to system operators and the like.

It is understood that the various functional blocks otherwise referred to herein as systems, processor, engine, and the like, including database reader 112, database validator 120, transaction log file reader 152, data correlator 140, and optional report generator 170 illustrated in FIG. 1 may be included in one or more general purpose processors configured to execute instructions and data. Thus, the various processes illustrated in FIG. 1 can be performed by processors adapted to the various tasks and coupled to one or more memories that store instructions adapted to be executed by the processor. The processor can be a general purpose microprocessor configured to execute instructions and data, such as a Pentium processor manufactured by the Intel Corporation of Santa Clara, Calif. It can also be an Application Specific Integrated Circuit (ASIC) that embodies at least part of the instructions for performing the method in accordance with the present invention in software, firmware and/or hardware. As an example, such processors include dedicated circuitry, ASICs, combinatorial logic, other programmable processors, combinations thereof, and the like. The memory can be any device capable of storing digital information, such as RAM, flash memory, a hard disk, a CD, etc. The processor can be coupled to the various databases, for example the source of the OLTP data, the profile data, the transaction log file data, the data cache 130, the transaction log data cache 160, or other databases that can store other pertinent information. Thus, processors as provided herein are defined broadly and include, but are not limited to processors performing data validation, correlation, and the like. These processes can thus be implemented using computer-readable medium storing a plurality of instructions for performing at least a portion of the methods included within the scope of the present invention.

As described more fully throughout the present specification, embodiments of the present invention compare database transaction to known transaction profiles. Since the applications have finite code paths, they can be compared against the database transaction to determine if the transaction was authorized. Additionally, by correlating database transactions to application server logs, a chain of trust is created between systems, thereby improving system confidence.

Figure 2:
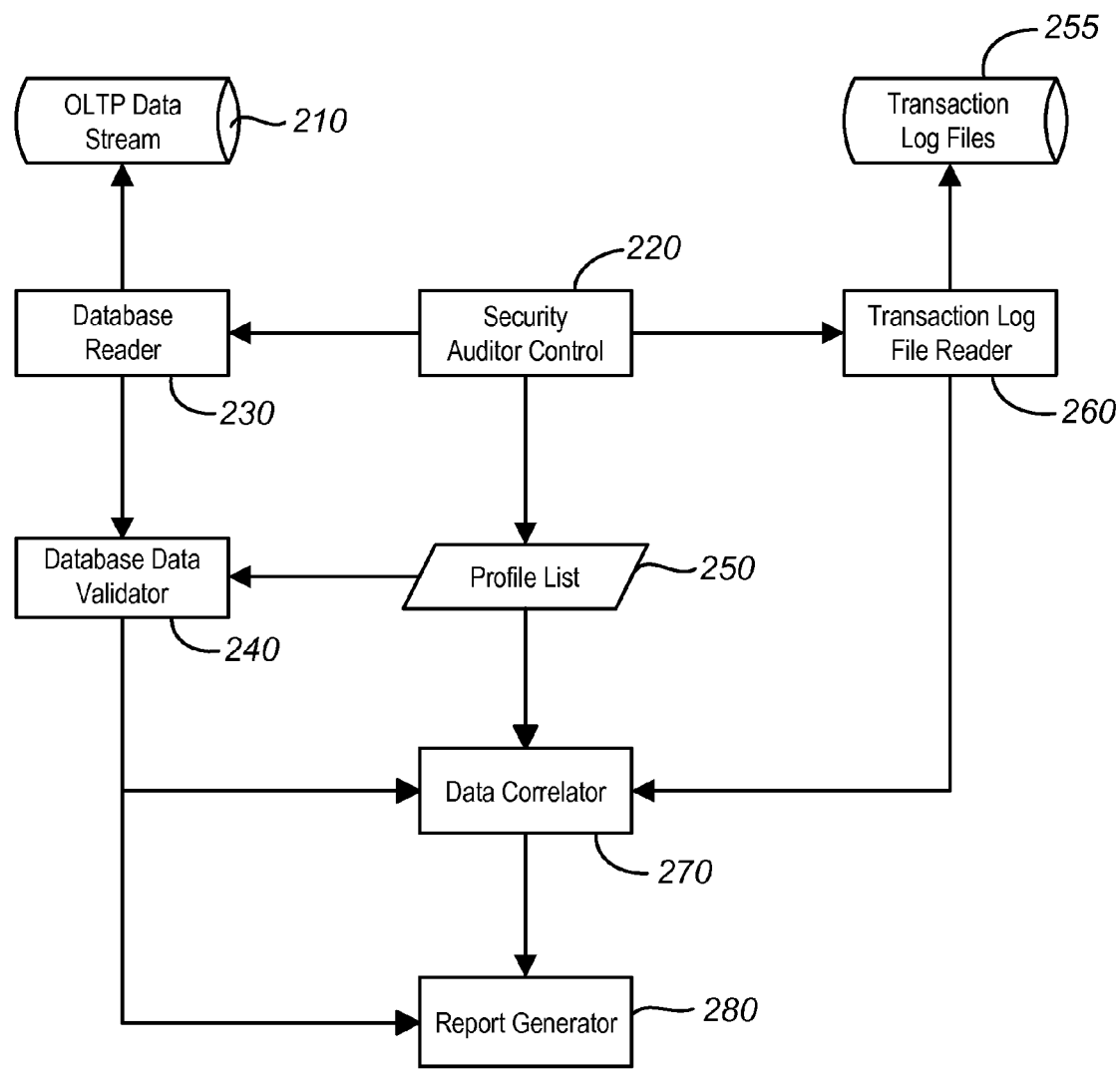
FIG. 2 is a high level execution flow chart for validating transaction data according to an embodiment of the present invention.

FIG. 2 is a high level execution flowchart for validating transaction data according to an embodiment of the present invention. Transaction data is stored in the database represented by the OLTP data stream 210. In the embodiment illustrated in FIG. 2, the transaction data is online transaction processing (OLTP) data although the present invention is not limited to this particular data set. A database reader 230 reads the transactions (e.g., OLTP transactions) from the transaction data stream and then parses the data. Control of the database reader is provided Security Auditor Control 220, which represents a part of the larger Security Auditor system. In the present specification, reference is made to the Security Auditor, which includes the components of database reader 230, security auditor control 220, transaction log files reader 260, database data validator 240, profile list 250, data correlator 270, and report generator 280, which are described more fully throughout the present specification and more particularly below. Thus, references to the Security Auditor should be understood as references to the system adapted to perform the methods described herein.

After the transaction data is parsed, the parsed transaction data is validated by comparison with existing profiles stored in the profile list 250. In the SRS registry database, each application has a finite code path based on the code itself. Thus, every transaction that occurs throughout an application should fit a known profile. A profile is metadata (expressed in XML files) describing an auditable registry operation. As discussed more fully below, the system will provide one profile per registry operation. By auditing all successful writable operations to the SRS registry database using the profiles, the transactions in the database can be validated as authorized. Merely by way of example, a profile may contain metadata related to operations performed during a registry operation (e.g., an INSERT into a particular table), business logic rules that are applied during a registry operation, and the like.

Embodiments of the present invention provide methods and systems in which the database is mined and the transactions are compared against all known profiles to determine if each transactions match a profile. If a transaction doesn't match one of the known profiles, this provides an indication that an anomaly has occurred. By validating the data, the security auditor ensures that the customer's intent was correctly persisted in the database and that all the business rules have been properly enforced. After validation, the validated transaction data can be stored in a cache referred to as the database data cache.

In addition to validation of the transaction data, the security auditor utilizes transaction logs created on the application side and correlates these transaction logs with the validated data. The transaction log files reader 260 pulls transaction logs from the transaction log file database 255. The transaction log files are created by the application servers. The transaction log files are parsed and in an optional step, are cached in a transaction data log data cache. The data correlator 270 is used to correlate the validated transaction data with the corresponding transaction log data to ensure that the changes made to the SRS registry database have come from a known source. As an example of an anomaly, if the transaction data (after validation) does not match the corresponding transaction log, then it provides an indication that the change to the database did not come from a known source. Accordingly, an alarm could be raised.

The report generator 280 is used to receive information from the database data validator 240 as well as the data correlator 270. Accordingly, reports can be generated based on data validation errors (i.e., transaction data not matching a known profile) or correlation errors. The reports can include information such as a list of transactions that failed validation, a count of the distinct validation errors, the total number of transactions audited, the amount of time taken to validate the transactions, and the like. An identifier in the transaction log on the application server is compared to the transaction in the database, ensuring that these elements match up as designed. Thus, the customer's intent in the transaction log is persisted properly in the database, which is represented by the OLTP data stream 210.

Utilizing embodiments of the present invention, all transactions that manipulate data within the registry database are verified to come from a known source and match a known profile associated with an existing application code path. The transactions are verified by mining transaction data from the database and comparing the transactions to a profile associated with the transaction to determine if known application logic flows were utilized in performing the transactions. Once the data is validated using the process flow profiles, it is then compared to application transaction logs. These comparisons provide a level of data integrity not available using conventional systems. Based on the validation process, the methods and systems described herein provide the added benefit of alerting operations staff if data is updated outside of the application, which could indicate malicious intent.

An exemplary use case for the methods and systems described herein is a hacker gaining access to the registry database and slowly deleting a certain number of domains per day outside of the authorized applications. The security auditor described herein would detect the unauthorized deletions since the changes would not comply with the profile established for deleting domains and does not come from a known source. Upon identification of the unauthorized character of the changes, an alert could be raised, thereby enabling the system operator to take corrective action.

Figure 3:
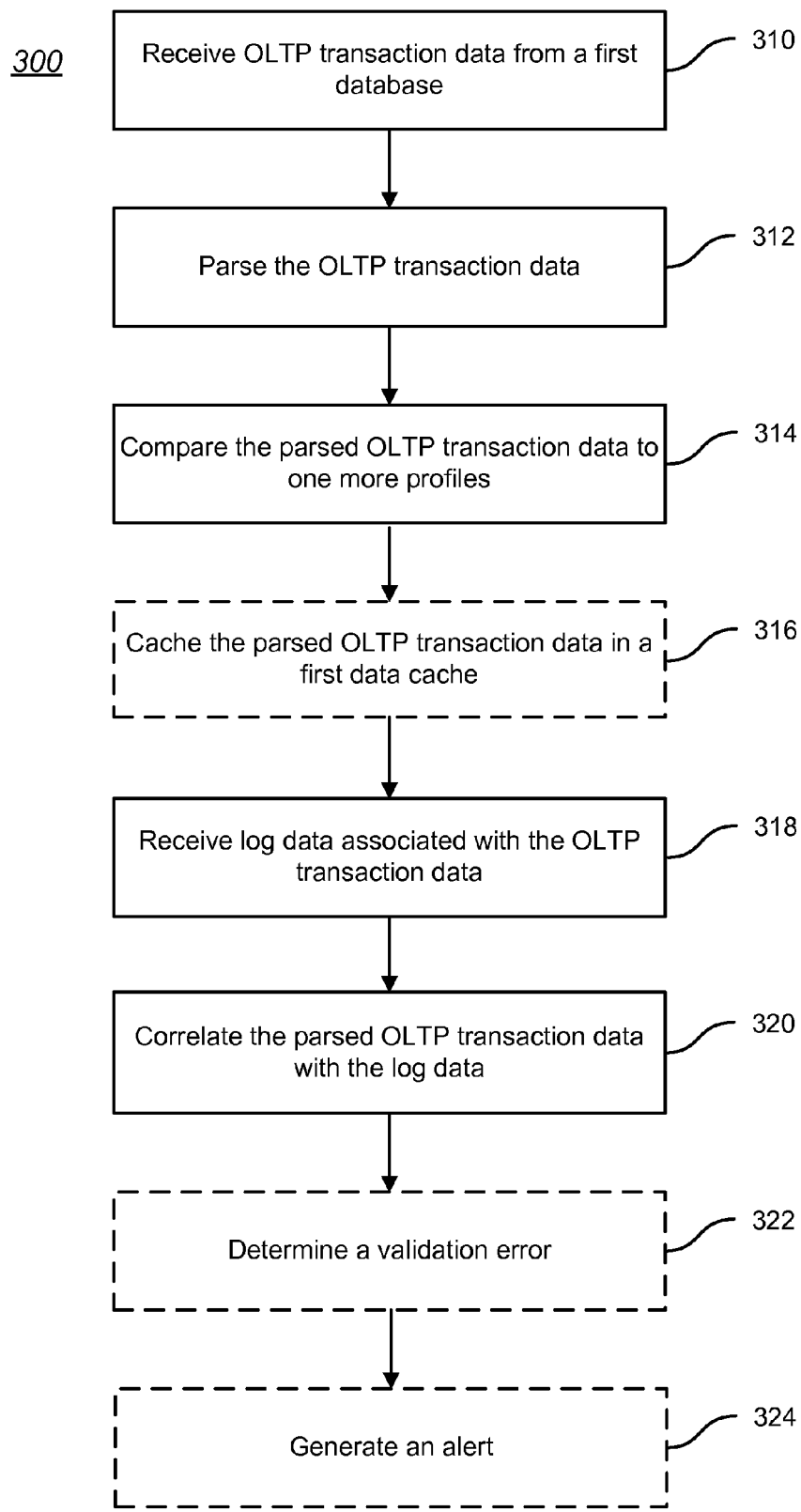
FIG. 3 is a simplified flowchart illustrating a method of validating transaction data according to an embodiment of the present invention.

FIG. 3 is a simplified flowchart illustrating a method of validating transaction data according to an embodiment of the present invention. The method 300 includes receiving OLTP transaction data from a first database (310). The first database may include an SRS registry database. The transaction data can be read by a database reader such as the LogMiner™ audit tool available from Oracle Corporation of Redwood Shores, Calif. or the GoldenGate transaction data integration software, available from GoldenGate Software of San Francisco, Calif. The method also includes parsing the OLTP transaction data (312). The OLTP transaction data can relate to a number of SRS database operations including adding a domain name, deleting a domain name, renewing a domain name, or the like. In other embodiments, the OLTP transaction data can relate to adding a domain name server, deleting a domain name server, or modifying a domain name server.

The parsed OLTP transaction data is compared to one or more of a set of profiles (314). Each of the one or more of the set of profiles comprises metadata in XML files. In accordance with the type of transaction data received, the profiles can include profiles related to operations such as adding a domain name, deleting a domain name, renewing a domain name, or the like. In other embodiments, the profiles can relate to adding a domain name server, deleting a domain name server, or modifying a domain name server.

In one embodiment, the method optionally includes caching the parsed OLTP transaction data in a first data cache (316), although this is not required by the present invention. The method further includes receiving log data associated with the OLTP transaction data (318) and correlating the parsed OLTP transaction data with the log data (320). In one embodiment, the log data can be cached in a second data cache, although this is not required by the present invention. In embodiments utilizing caches, the correlation process can utilize parsed data that is cached and log data that is cached.

The method 300 can also optionally include determining a validation error (322) and generating an alert related to the validation error (324). As an example of the alert, one or more reports (e.g., a detail report and a summary report) can be generated for use by system operators or other.

It should be appreciated that the specific steps illustrated in FIG. 3 provide a particular method of validating transaction data according to an embodiment of the present invention. Other sequences of steps may also be performed according to alternative embodiments. For example, alternative embodiments of the present invention may perform the steps outlined above in a different order. Moreover, the individual steps illustrated in FIG. 3 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 4:
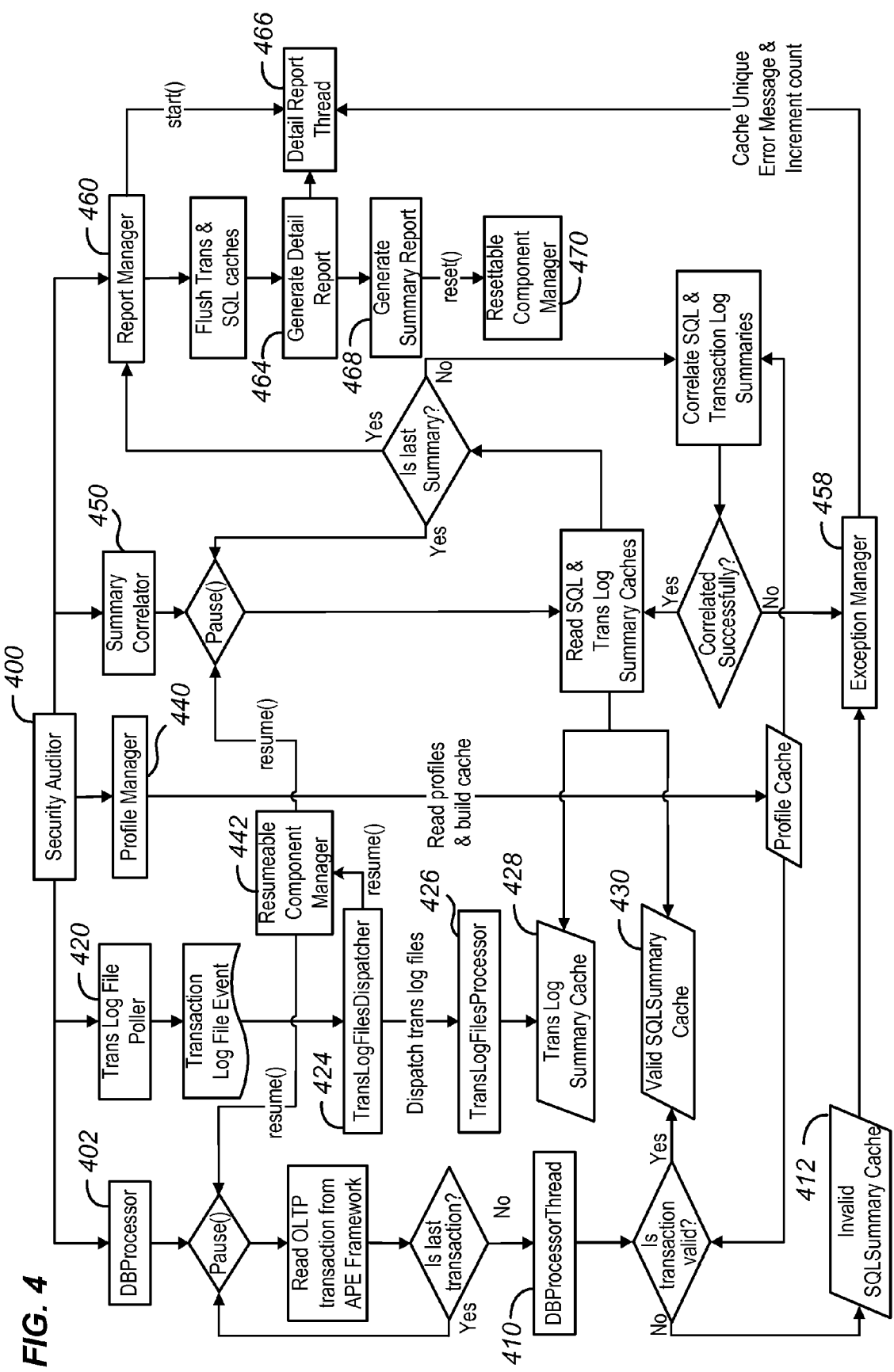
FIG. 4 is a simplified diagram illustrating execution flow during transaction data validation according to an embodiment of the present invention.

FIG. 4 is a simplified diagram illustrating execution flow during transaction data validation according to an embodiment of the present invention. The Security Auditor 400 is illustrated as including a number of components that are described below.

According to an embodiment of the present invention, the Security Auditor is instantiated by the APE (Asynchronous Processing Engine) framework. The APE framework is responsible for reading OLTP transactions from transaction log files (e.g., Golden Gate trail files) and making them available in a memory queue for consumption by downstream applications. The Security Auditor is one such downstream application. The Security Auditor is instantiated with a configuration file and the start date time at which the transactions are to be audited. In the implementation described herein, the Security Auditor on startup will instantiate and start the following components.

MBean server for registering various mbeans to display statistics such as the number of transactions processed, etc.

Initialize the Valid SQLSummary Cache 430, also referred to as the SQL cache, and the transaction log summary cache 428. The Valid SQLSummary Cache 430 is the list of SQL statements that are loaded into memory from the data stream. Inserts, updates, and deletes that occurred in the database are included in this cache, thus providing a data store for the stream.

Initialize Exception Manager 458.

Profile Manager 440 to read, parse, and cache profiles for registry operations that are to be audited. Profiles are cached using the OPERATIONID and the concept class name associated with the operation.

DBProcessor 402 is initialized to be ready to start retrieving OLTP transactions from the APE Framework.

Start Transaction log files poller 420 to poll the specified directories for transaction log files.

Summary Correlator Manager 450 is initialized to be ready to start correlating SQL and transaction log summaries from their respective caches.

Security Auditor Report Manager 460 to be ready to generate a report after all transactions have been audited. Security Auditor Report Manager 460 will then instantiate and start the SecurityAuditorDetailReport thread 466.

Security Auditor registers itself with ResettableSAComponentManager 470 as a resettable component.

The following is a high level explanation of the execution steps in the Security Auditor:

1. The Security Auditor is initialized with a start date time at which transactions should be audited. The end date time at which auditing of transactions should be paused and a report is generated, is calculated by adding the number of report chunk size hours specified in the configuration file. This end date time is then passed to the DBProcessorThread and SummaryCorrelator classes.

2. The DBProcessor component 402 creates a thread of pool of DBProcessorThread objects 410. DBProcessorThreads are in a wait state waiting to be notified by the ResumeableComponentManager 442 to start retrieving OLTP transactions from the APE Framework.

3. The SummaryCorrelatorManager 450 component creates a thread of pool of SummaryCorrelator objects. The SummaryCorrelator threads are in a wait state waiting to be notified by the ResumeableComponentManager 442 to start correlating the SQL summaries with the transaction log summaries.

4. The TransLogFilePoller 420 is polling the input transaction log files folder for the appearance of transaction log files.

5. When transaction log files are copied to the input transaction log files folder via a cron job (i.e., scheduled tasks) using the provided log copy (logcopy.pl) perl script, the following sequence of events occur:

TransLogFilePoller 420 dispatches the files to TransLogFilesDispatcher 424.

TransLogFilesDispatcher 424 will sort and group the transaction log files by date using the start date time in the Security Auditor.

One day's worth of transaction log files are then passed to the TransLogFilesProcessor 426, which then distributes the transaction log files evenly across the number of TransLogFileProcessorThread objects.

Each TransLogFileProcessorThread will then instantiate a TransLogFileReader for each of the transaction log files assigned.

Each TransLogFileProcessorThread will then round robin over the set of TransLogFileReader objects reading a chunk of the transaction log file.

The transaction log entries are parsed into TransLogSummary objects and cached in the TransLogSummaryCache 428.

TransLogFilesDispatcher 424 will then notify the ResumeableComponentManager 442 to notify other waiting components to resume auditing.

TransLogFilesDispatcher 424 will then be in a wait state waiting to be notified by the SummaryCorrelatorManager 450 to start processing the next day's transaction log files.

6. ResumeableComponentManager 442 will then notify DBProcessorThread and SummaryCorrelator threads to resume auditing.
7. DBProcessor threads start retrieving OLTP transactions from the APE Framework. Transactions that pass the validation rules in the associated profile for the registry operation are then converted into SQLSummary objects and cached in the SQLSummaryCache 430.
8. SummaryCorrelator threads start retrieving a SQLSummary from the SQLSummaryCache 430 and the corresponding TransLogSummary from the TransLogSummaryCache 428. Transaction log validation rules are applied on the both summaries. Any validation errors are logged.
9. When DBProcessorThread 410 retrieves an OLTP transaction from the APE Framework whose creation time stamp is greater than the end date time specified in the Security Auditor, the thread goes into a wait state. This thread will be notified to resume when the next day's worth of transaction log files are received.
10. Similarly, when the SummaryCorrelator threads retrieve a SQLSummary whose creation time stamp is greater than the end date time specified in the Security Auditor, the thread goes into a wait state. This thread will be notified to resume activity when the next day's worth of transaction log files are received.
11. SummaryCorrelatorManager 450 will then notify SecurityAuditorReportManager 460 to generate a report.
12. SecurityAuditorReportManager 460 will flush the transaction log and SQL summary caches and generate two reports: a summary report 468 which gives a high level report of the types and counts of errors and a detail error report 464. Other reports can be generated as appropriate to the particular application.
13. SecurityAuditorReportManager 460 will then notify the ResettableSAComponentManager 470 to signal reset( ) to the resettable components so that they are in a state to be ready to process the next day's transaction log files.
14. SummaryCorrelatorManager 450 will then notify the TransLogFilesDispatcher 424 that it can go ahead and start processing the next day's transaction log files.

It should be appreciated that the specific steps illustrated in FIG. 4 provide a particular method of operating the Security Manager according to an embodiment of the present invention. Other sequences of steps may also be performed according to alternative embodiments. For example, alternative embodiments of the present invention may perform the steps outlined above in a different order. Moreover, the individual steps illustrated in FIG. 4 may include multiple sub-steps that may be performed in various sequences as appropriate to the individual step. Furthermore, additional steps may be added or removed depending on the particular applications. One of ordinary skill in the art would recognize many variations, modifications, and alternatives.

According to embodiments of the present invention, the Security Auditor utilizes the Service Provider Interface (SPI) model to ensure that different components can be plugged in and out. For example, if the decision is made to move from one database services application (e.g., from LogMiner™ audit tool available from Oracle Corporation of Redwood Shores, Calif. to GoldenGate transaction data integration software, available from GoldenGate Software of San Francisco, Calif.), then the code to parse GoldenGate will be written to provide the same information as that provided using LogMiner™.

According to a specific embodiment, all programming will be done using the interfaces as exposed by the SPI. Depending on the embodiment, a number of different high level interfaces can be utilized to provide the following functionality:

Interfaces to be implemented by the cache managers.
Interfaces for Correlator classes which correlate the information in a SQL summary with the information in a transaction log summary.
Interfaces for dispatching events (Currently used to dispatch transaction log files).
Classes that subclass java.lang.Exception for the different kinds of validation exceptions that can be thrown or raised by the Security Auditor.
Interfaces to expose profile information for registry operations.
Interfaces to be implemented by components that need to reset after processing a unit of transaction log files.
Interfaces to be implemented by components which need to resume processing when a unit of transaction log files are available.
Interfaces to aid in the proper shutdown of different components.
Interfaces to represent the information in a SQL statement.
Interfaces for SQL and transaction log summaries.

The present invention is not limited to these particular interfaces and the functionality they provide. In alternative embodiments, other interfaces are utilized as will be evident to one of skill in the art.

Asynchronous Process Engine (APE) Framework

As discussed above, one implementation integrates the Security Auditor with the APE Framework. The APE Framework has two main responsibilities:

Instantiate the SecurityAuditorFacade, which in turn instantiates the SecurityAuditor engine. SecurityAuditorFacade is the integration class between SecurityAuditor and APE Framework. SecurityAuditorFacade may be instantiated via Spring injection. The start and end date times for which the transactions need to be audited are computed and set in the Security Auditor.
Make the OLTP transactions available in an in memory queue via the SecurityAuditorFacade.

Management Server (JMX)

Security Auditor will host a management server. There are a number MBeans registered with the management server, which may include the following list of MBeans. This list of MBeans is provided merely by way of example and additional MBeans can be added as appropriate to the particular application. One of ordinary skill in the art would recognize many variations, modifications, and alternatives.

ExceptionManagerMBean: Provides a count of the number and type of validation exceptions.
SecurityAuditorConfigMBean: Provides details regarding the configuration information in the configuration file.

SecurityAuditorMBean: Provides operations to shutdown the Security Auditor and all it's components in an orderly manner.

SQLSummaryCacheManagerMBean: Provides information regarding the number of SQL summaries in cache.

TransLogSummaryCacheManagerMBean: Provides information regarding the number of transaction log summaries in cache.

SummaryCorrelatorManagerMBean: Provides information regarding the number of transactions correlated and the timestamps of the last SQL and transaction log summaries processed.

Profile Manager is a singleton class which reads the profiles that are in XML format and caches them in memory. On startup, the Security Auditor will initialize the Profile Manager with the location of the profiles. In one implementation, profiles are cached in a java.util.TreeMap. Each profile may be cached in two tree maps in memory with the following keys:

Operation ID (Integer): Profiles will be retrieved based on the value of 'OPERATIONID' column specified in the 'INSERT INTO TRANSACTION' table SQL statement. This mode of access is done by the DBProcessorThread class to find the matching profile information using the data in the OLTP transaction.

Concept Class Name (String): Profiles will be retrieved based on the value of the concept class name transaction log entry. This mode of access is done by the TransLogProcessorThread class to find the matching profile information using the data in the transaction log entry.

As an example of a profile, a registry operation profile is represented by the following interface:

```
public interface RegistryOperationProfile extends Serializable {
    OperationInfo getOperationInfo ( );
    DatabaseInfo getDatabaseInfo ( );
    Validator getValidator ( );
}
```

The SQL Summary Cache Manager (SQLSummaryCacheManager) is a singleton class which is a cache of the SQL summaries. SQL summaries are cached in a java.util.LinkedBlockingQueue. DBProcessor threads will add valid SQL summaries to this queue. The transaction Id associated with a database transaction which has not passed all the database validation rules will be cached in a HashSet. This way, when the corresponding transaction log entry expires, it is known that it was associated with an invalid SQLSummary to begin with.

If the SCN of the SQL summary is less than the maximum SCN read in the transaction log file minus the SCN threshold, the entry is removed from the cache and a SQLSummaryExpired exception is thrown. The maximum size of the SQL summary cache is controlled by a parameter in the 'sa.config' configuration file. This value is passed to the SQLSummaryCacheManager by the Security Auditor during the initialization phase.

The Trans Log Summary Cache Manager (TransLogSummaryCacheManager) is a singleton class which is a cache of the transaction log summaries. Transaction log summaries are cached in an inner class ExpiringTransSummaryCache which extends java.util.LinkedHashMap. TransLogProcessorThread classes will add valid transaction log summaries to this map.

For every transaction log summary added to the ExpiringTransSummaryCache, the removeEldestEntry( ) method is invoked with the least recently used (LRU) entry in the map. If the SCN of the transaction log entry is less than the maximum SCN read in the database transaction minus the SCN threshold, the entry is removed from the cache and a TransLogSummaryExpired exception is thrown. The SCN threshold is set by a parameter in the 'sa.config' configuration file. The maximum size of the transaction log summary cache is controlled by a parameter in the 'sa.config' configuration file. This value is passed to the TransLogSummaryCacheManager by the Security Auditor during the initialization phase.

The Exception Manager 458 is illustrated in FIG. 4. Whenever an exception is thrown in the Security Auditor, the constructor in the base SAException class performs two functions:

Logs the given error message at ERROR level using the supplied logger.

Invokes a method in the ExceptionManager class to increment the count of the specified exception.

A singleton class com.verisign.sa.spi.exception.ExceptionManager is provided and a cache (HashMap<String className, AtomicInteger>) is used to keep track of the number of validation errors based on the error type. The SecurityAuditorReport class uses this information when generating a report.

Embodiments of the present invention provide a log copy script, which is a perl script (e.g., logcopy.pl) that is used to copy all the relevant transaction log files to the input transaction log folder being monitored by the TransLogFilesPoller. The script will then 'scp' all the transaction log files to an input transaction log folder. The file 'build.properties' will be modified as needed to include the IP addresses of all the servers which have transaction log files.

A parameter, logcopy.date.interval, specifies how far back to go in number of days to copy the transaction log files. A value of '1' specifies that transaction log files from yesterday need to be copied. Similarly, a value of '2' will copy day before yesterday's and yesterday's transaction log files. After all the log files have been copied, Log Copy will then create a file named 'trigger' in the input transaction log folder. This is to ensure that Security Auditor will only start processing after all the transaction log files have been copied. Log Copy will be scheduled as a cron job to run at 2 a.m. every day.

The Transaction Log Files Poller (TransLogFilesPoller) 420 illustrated in FIG. 4 is used to poll the directory specified in a configuration file for the specific file named 'trigger'. The transaction log files parameters are specified in a configuration file.

Referring once again to FIG. 4, the transaction log files are copied to the input transaction log files folder via a cron job using the log copy (logcopy.pl) perl script that is provided and the following sequence of events occur:

The TransLogFilePoller 420 dispatches the trigger file to TransLogFilesDispatcher.

The TransLogFilesDispatcher 424 will delete the trigger file. All the transaction log files in the input transaction log folder are moved to the in-process transaction log folder.

The TransLogFilesDispatcher 424 will sort and group the transaction log files by date using the start date time in the Security Auditor.

One day's worth of transaction log files are then passed to the TransLogFilesProcessor 426, which then distributes the transaction log files evenly across the number of TransLogFileProcessorThread objects. The number of TransLogFileProcessorThread objects created is specified in the configuration file as follows: sa.translogsummary.threadpool.size=2.

Transaction
Each TransLogFileProcessorThread will then instantiate a TransLogFileReader for each of the transaction log files assigned.
Each TransLogFileProcessorThread will then round robin over the set of TransLogFileReader objects reading a chunk of the transaction log file.
The TransLogFileReader object for each entry in the transaction log file would perform the following operations:
Decode the transaction log entry to produce a Transaction Log Summary.
Parse the timestamp of the transaction log entry to get the creation time stamp for the transaction log summary.
Cache the transaction log summary in a HashMap keyed by the transaction ID.
After a transaction log file is completely processed, the TransLogFileReader object will move the file to the processed transaction logs folder.
TransLogFilesDispatcher 424 will then notify the ResumeableComponentManager 442 to notify other waiting components to resume auditing.
TransLogFilesDispatcher 424 will then be in a wait state waiting to be notified by the SummaryCorrelatorManager 450 to start processing the next day's transaction log files (if they are available).

Database processor threads are initially in a waiting state to be notified by the Resumeable component manager 442 to start retrieving database transactions from the APE Framework. As OLTP transactions are read from the APE Framework via the SecurityAuditorFacade, the following steps will occur:

1. For each OLTP transaction retrieved from the APE Framework:
The value of OPERATIONID column is retrieved from the 'INSERT INTO TRANSACTION' SQL statement.
If the value of the OPERATIONID column is not one of the auditable operations, then all the SQL statements within this transaction boundary are discarded.
If there is no 'INSERT INTO TRANSACTION' SQL statement, then the entire set of SQL statements within the transaction boundary are deemed to be malicious SQL statements.
The corresponding profile for the set of SQL statements in the transaction will be retrieved from the ProfileManager 440 using the value of the OPERATIONID.
2. The relevant information (as specified in the profile) in the parsed SQL statements is copied to an SQL statement. A collection of these SQL statements (along with other information) will eventually be used to form an SQL summary.
3. Relevant database validation rules such as referential validation, look up validation, regex validation, or the like, are applied. SQL statements that fail these validations are flagged (e.g., immediately) as an error. The corresponding transaction ID is persisted to the 'Invalid SQL Summary' cache 412 and passed to the Exception Manager 458.
4. Once all the validations have passed for the SQL statements, the resulting SQL summary is cached only if it has a corresponding transaction log entry as specified by the XML attribute "transLogEntryExists=true/false" in the profile. The profile associated with the collection of SQL statements is also stored along with the SQL summary.
5. In addition, the transaction date is used as the creation time stamp for the summary that is cached. Later on in the process, when a summary is retrieved from the cache, the creation time stamp of the cache is used to check if the cache entry has expired (i.e., a corresponding transaction log summary had not been found within a specified period of time).
6. When a transaction with a transaction date that is greater than or equal to the end date time in the Security Auditor is found, the database processor thread will go into a wait state. The database processor threads will resume retrieving transactions from the APE Framework when they are notified by the TransactionLogFilesDispatcher 424 that a new set of transaction log files have been received.

As described throughout the present specification, there are three sets of thread that are executed concurrently in the Security Auditor. The SummaryCorrelator 450 (also referred to as a SummaryCorrelatorManager) is responsible for the creation and management of the correlator threads thread pool. The three sets of threads executing concurrently in the Security Auditor are:
SQL summary threads are parsing SQL statements and caching SQL summaries.
Transaction log threads are parsing transaction log files and caching transaction log summaries.
Correlator threads are concurrently (e.g., simultaneously) retrieving the SQL summary and the corresponding transaction log summary from both caches. Because this set of threads is correlating the information from the SQL summary with the information in the transaction log summary, they are referred to as the Correlator threads.

The number of threads to create is specified in the configuration file. The SummaryCorrelatorManager 450 will notify the TransLogFileDispatcher 424 when it is done correlating a unit of transactions between the SQL and transaction log summaries.

The SecurityAuditorReportManager is initialized by the Security Auditor on startup. Reports generated by the Report Manager 460 will be written to a folder specified by a parameter in the configuration file.

In a specific embodiment, the report file name will have the following format: <Start Date Time>[MMddyyyyHHmmss]-to-<End Date Time>[MMddyyyyHHmmss]-<Report Type>.txt. As an example, a report could be named: 11012009000000-to-11022009000000-Summary.txt—for a report generated for transactions beginning at midnight on Nov. 1, 2009 and ending at Nov. 2, 2009 midnight.

As illustrated in FIG. 4, two types of reports are provided: either 'Summary' or 'Detail'. Additional description related to the summary and detail reports is provided throughout the present specification and more particularly below. Prior to generating the report, SecurityAuditorReportManager will perform the following actions:
Flush SOL Summary Cache:
The SQL summaries in the cache are iterated over one final time to ensure that any additional SQL summaries that can be correlated with the corresponding transaction log summaries will be correlated.
If the corresponding transaction log summary is not found and if the SQL summary has not expired, it is put back in the cache.

Any SQL summaries which have expired will be failed with a 'SQLSummaryExpiredException'. A SQL summary is deemed to have expired if the SCN in the summary is less than the maximum SCN read in the transaction log files minus a SCN threshold value. As an example, the SCN threshold value can be set at 10,000.

Flush Trans Log Summary Cache:
  For all the transaction log summaries in the Trans Log Summary Cache, the following actions will be performed:
    Check to see if the transaction Id corresponding to this TransLogSummary is present in the 'Invalid SQL Summary' cache. The transaction Id of the database transaction which has failed the database validation rule will be present in this cache. If the transaction Id is present in the 'Invalid SQL Summary' cache, then the entry is removed from cache and ignored.
    If the transaction Id is not present in the 'Invalid SQL Summary' cache and the summary has not expired, then it is put back into the cache.
  If the transaction log summary has expired, it is removed from the cache and is failed with a 'TransLogSummaryExpiredException'. A transaction log summary is deemed to have expired if the SCN in the summary is less than the maximum SCN read from the database transactions minus a SCN threshold value. As an example, the SCN threshold value can be set at 10,000.

Two reports (detail and summary) will be generated for transactions audited beginning at the startDateTime and ending at the endDateTime specified in the Security Auditor. The parameter which controls the report time duration is specified in a configuration file. After the report is generated, ResettableComponentManager 470 is invoked to reset the statistics in all the resettable components. Resettable components will be discussed in more detail below.

As discussed above, the Security Auditor will generate at least two reports: a summary report, which is a high level report that just mentions the types and counts of validation errors encountered; and a detail report, which contains details about each error that has occurred and the number of times it has occurred. When SecurityAuditorReportManager 460 is initialized on startup, it instantiates and starts the DetailReport thread 466. As validation errors occur, a detail version of the error message is placed in a queue. The DetailReport thread 466 will read the error messages off this queue. It will then check a cache to see if an identical error message was encountered before. If an identical error message is already present in the cache, then the count is incremented. If an identical error message is not found in the cache, then the message is added to the cache with a count of 1.

By providing the DetailReport thread 466 as a thread in and of itself, embodiments of the present invention ensure that the validation threads continue to do their work of validating without having to wait for the detail error message to be checked in the cache.

Embodiments of the present invention provide for notification of certain components in the Security Auditor when certain events happen that would trigger the resumption of their activity. The ResumableComponentManager 442 is provided for this purpose. The components that will wait for such events to resume processing are resumeable components in the Security Auditor. All resumeable components register themselves with ResumeableComponentManager 442 to be notified of such events by implementing the following interface.

```
public interface ResumeableSAComponent {
    void resumeAuditing ( );
}
```

The TransLogFilesDispatcher 424 will invoke ResumeableSAComponentManager.resumeAuditing( ) when one day's worth of transaction log files are received. ResumeableSAComponentManager 442 will in turn invoke the resume( ) method on all the registered ResumeableSAComponents.

The following components in the Security Auditor implement the ResumeableSAComponent interface and register themselves with the singleton ResumeableSAComponentManager class:
  DBProcessor: This class is responsible for retrieving OLTP transactions from the APE Framework. When a transaction whose timestamp is greater than the 'endDateTime' specified in the SecurityAuditor is retrieved, this thread will go into a wait state. Upon notification from the ResumeableSAComponentManager 442, DBProcessor 402 will continue to retrieve transactions from the APE Framework.
  SummaryCorrelatorManager: SummaryCorrelatorManager 450 creates and manages the correlator threads which correlate the information in both the caches (Trans & SQL Summary caches). After a correlator thread retrieves a SQLSummary whose timestamp is greater than the 'endDateTime' specified in the SecurityAuditor, this thread will go into a wait state. Upon notification from the ResumeableComponentManager 442, SummaryCorrelatorManager 450 will notify the correlator threads to continue the correlating activity.
  SecurityAuditorReportManager: The report generated by the SecurityAuditorReportManager 460 indicates how long it has taken to audit the transactions received. Upon notification from the ResumeableComponentManager 442, SecurityAuditorReportManager 460 will reset the variable keeping track of the time to the current time.

Embodiments of the present invention provide for notification of certain components in the Security Auditor when certain events happen that would trigger the reset of the variables that hold statistics about the transactions currently being audited. The resettable components register themselves with ResettableComponentManager 470 to be notified of such events by implementing the following interface.

```
public interface ResettableSAComponent {
    /**
     * Reset state in the component.
     */
    public void reset ( );
}
```

The SecurityAuditorReportManager 460 will invoke ResettableSAComponentManager.resetComponents( ) to reset the state in the resettable components after a report has been generated. ResettableSAComponentManager 470 will in turn invoke the reset( ) method on all the registered ResettableSAComponents.

The following components in the Security Auditor implement the ResettableSAComponent interface and register themselves with the singleton ResettableSAComponentManager class:
  SecurityAuditor: SecurityAuditor 400 in its reset( ) method will set the new startDateTime to be the current endDateTime. It also recalculates the new endDateTime by adding the number of report chunk hours to the new startDateTime.

SQLSummaryCacheManager: SQLSummaryCacheManager 430 will reset the variable which holds the total number of SQL summaries added to cache to be equal to the cache size. It also clears the invalid SQL summary cache.

SummaryCorrelatorManager: SummaryCorrelatorManager 450 will reset the total number of correlated transactions to zero.

TransLogSummaryCacheManager: TransLogSummaryCacheManager 428 will set the last processed transaction log summary time stamp to null. It also sets the number of transaction log summaries in cache to zero.

ExceptionManager: ExceptionManager 458 will reset the counts associated with all exception types to zero.

Components in the Security Auditor which need to perform some cleanup action in the event of a shutdown by implementing the following interface:

```
public interface ShutDownListener {
    public void shutDown ( );
}
```

When Security Auditor's shutDown( ) method is invoked via JMX, it invokes ShutDownManager.shutDown( ) method. Prior to invoking this method, Security Auditor will write the timestamp of the last processed SQLSummary to 'startdate.txt' file. Thus, when Security Auditor is started again, it knows where it left off. ShutDownManager will then invoke the shutdown( ) method on all the registered ShutDownListener classes.

The following components in the Security Auditor implement the ShutDownListener interface and register themselves with the singleton ShutDownManager class:

DBProcessor: DBProcessor 402 will shut down the thread pool of DBProcessorThread 410 classes and will interrupt itself.

SummaryCorrelatorManager: SummaryCorrelatorManager 450 will shut down the thread pool of SummaryCorrelator threads.

TransLogFilesPoller: This class extends 'org.sadun.util.polling. DirectoryPoller'. DirectoryPoller is a thread polling the input transaction log files folder. The shutdown( ) in the DirectoryPoller class is invoked.

TransLogFilesProcessor: TransLogFilesProcessor 426 will shut down the thread pool of TransLogFilesProcessorThread classes.

Embodiments of the present invention provide a specific profile for each registry operation. The profiles include, but are not limited to:
ADD-DOMAIN=2
MOD-DOMAIN=3
DEL-DOMAIN=4
ADD-NAMESERVER=5
MOD-NAMESERVER=6
DEL-NAMESERVER=7
TRANSFER-DOMAIN=11
RENEW-DOMAIN=12
SESSION=13
QUIT=14
SYNC-DOMAIN=75
RESTORE-DOMAIN=78
RESTORE-REPORT=79

For example, a 'login' EPP command will insert into the REGISTRYSESSION and TRANSACTION tables. Profiles for each registry operation are provided in a separate XML file that captures metadata regarding a registry operation. By having validation information in an XML file, the implementations described herein separate the code to perform validation from the actual metadata present in the profile. Preferably, the validation rules will be expressed in the profiles. For certain corner case validations which may be cumbersome to express in XML, a Java hook could be provided to perform the complex one off validation.

An XML schema has been created to represent the profile for all registry operations. XMLBeans are used to parse and navigate the data within a profile. Once a profile has been parsed, it is further converted into a framework of classes to represent the metadata information. This would then free the application of relying on the format in which the original profile information is stored, or for that matter, where it is stored.

Figure 5:
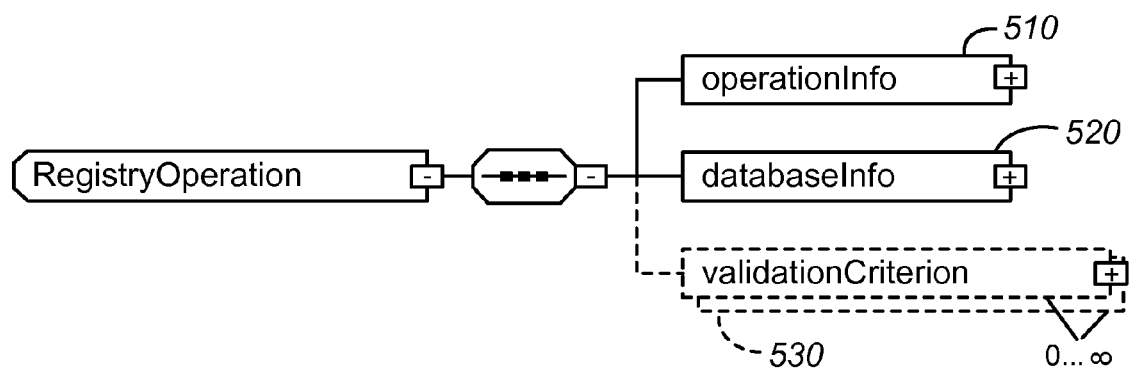
FIG. 5 is a simplified diagram illustrating metadata for a registry operation according to an embodiment of the present invention.

A profile for a registry operation contains the following three (3) pieces of metadata: Operation Info, Database Info, and Validation Criterion. FIG. 5 is a simplified diagram illustrating metadata for a registry operation according to an embodiment of the present invention. A registry operation profile is represented by the following interface:

```
Public interface RegistryOperationProfile extends Serializable {
    OperationInfo getOperationInfo ( );
    DatabaseInfo getDatabaseInfo ( );
    Validator getValidator ( );
}
```

Figure 6:
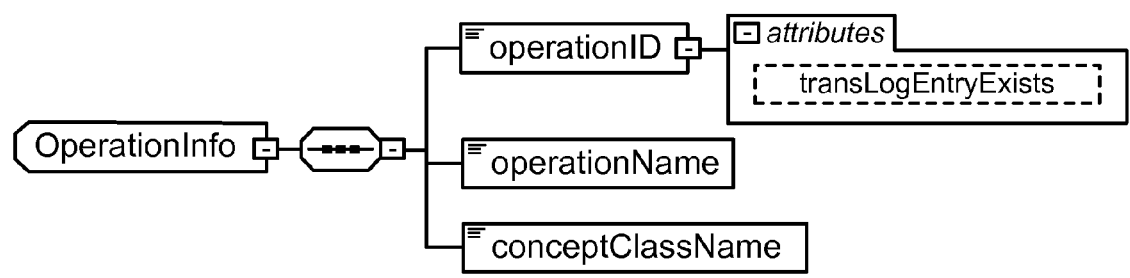
FIG. 6 is a simplified diagram illustrating metadata for OperationInfo according to an embodiment of the present invention.

OperationInfo 510 captures information regarding a registry operation. A profile can be retrieved from cache based on the operationID. When SQL statements are parsed, the relevant profile is retrieved based on the operationID (i.e., insert into Transaction table has the operationID of the registry operation). FIG. 6 is a simplified diagram illustrating metadata for OperationInfo according to an embodiment of the present invention.

An example of OperationInfo metadata is:

```
<operationInfo>
    <operationID transLogEntryExists="true">2</operationID>
    <operationName>ADD-DOMAIN</operationName>
    <conceptClassName>RegisterDomainOp</conceptClassName>
</operationInfo>
```

Figure 7:
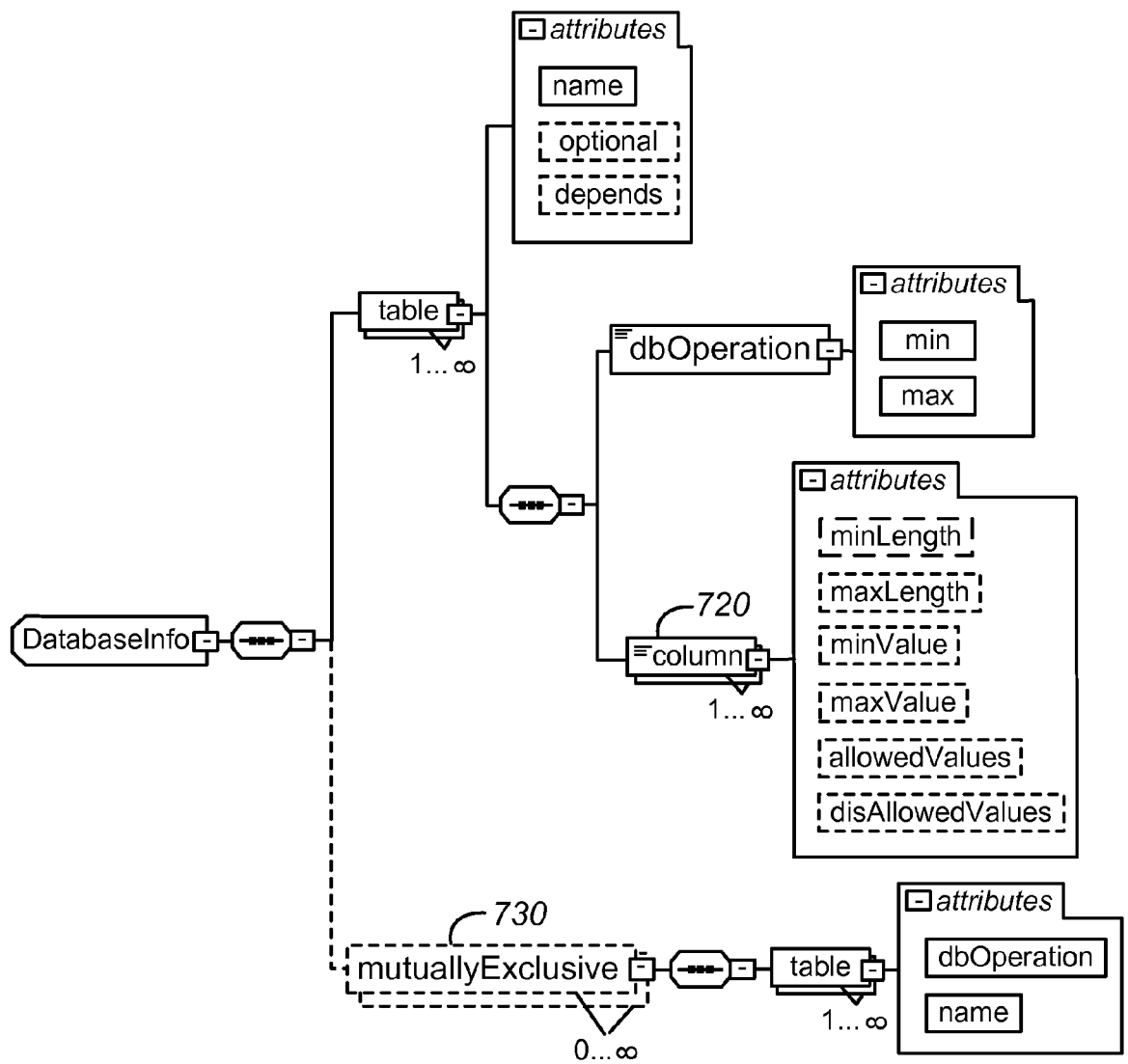
FIG. 7 is simplified diagram illustrating metadata for DatabaseInfo according to an embodiment of the present invention.

FIG. 7 is simplified diagram illustrating metadata for DatabaseInfo according to an embodiment of the present invention. DatabaseInfo 520 captures all the tables that participate in a registry operation. A table can be optional or required. In addition, the 'depends' attribute specifies that an operation on a table is required if and only if an operation on the table it depends on is also part of the transaction. As an example, for an Add Domain operation, DOMAINNAMESERVERLINK depends on the DOMAIN table. Thus, unless an operation on the DOMAIN table is also part of the transaction, one would not expect a corresponding operation on the DOMAINNAMESERVERLINK table.

The 'dbOperation' 710 specifies whether it was 'insert, update or delete' operation on the table. The 'min/max' attributes specifies the minimum and maximum number of the specified operations on the table. The 'column' elements 720 specify the columns of interest to parse and cache from the associated SQL statement. As an example, there could be 10 columns in a SQL statement, but there may be only two columns whose values are cached.

According to embodiments of the present invention, constraints can be specified on columns. The following attributes of the column element 720 specify the constraints:
 minLength—minimum length of this column
 maxLength—maximum length of this column
 minValue—minimum 'integer' value of this column
 maxValue—maximum 'integer' value of this column.
 allowedValues—a comma separated list of values allowed for this column
 disAllowedValues—a comma separated list of values not allowed for this column The mutually exclusive tables element 730 specifies the operations on tables that are mutually exclusive as part of this operation.

As an example of a logic flow for an add domain profile, the following snippet is an example of an ADD-DOMAIN profile, which is associated with transactions in which a domain name is added:

```
<databaseInfo>
    <table name="DOMAIN" optional="false"
    depends="TRANSACTION">
        <dbOperation max="1" min="1">insert</dbOperation>
        <column>DOMAINID</column>
        <column minLength="7" maxLength="67">DOMAINNAME
        </column>
        <column minValue="1" maxValue="10">
        REGISTRATIONPERIOD</column>
        <column>REGISTRATIONEXPIRATIONDATE</column>
        <column>TRANSACTIONID</column>
        <column minLength="3" maxLength="32">AUTHINFO</column>
        <column>CREATEDDATE</column>
        <column allowedValues="3,14">ENCODINGTYPEID</column>
        <column>PARENTDOMAIN</column>
        <column allowedValues="Y">ZONEINSERTION</column>
    </table>
</databaseInfo>
```

The XML from this snippet specifies that the minimum value for REGISTRATIONPERIOD is '1' and the maximum value is '10'. Similarly, the minimum length of the DOMAINNAME column is '7' and the maximum length is '67'. The allowable values for ENCODINGTYPEID are '3 or 14'. Other values are utilized in other particular implementations and these values are merely provided by way of example.

In order to illustrate a profile for deleting a domain name, the following snippet is provided for a DEL-DOMAIN profile:

```
<mutuallyExclusive>
    <table name="DOMAIN" dbOperation="update"/>
    <table name="DOMAIN" dbOperation="delete"/>
</mutuallyExclusive>
```

When a delete domain operation occurs on a domain within the grace period, a DELETE on the DOMAIN table SQL statement is issued by the application. On the other hand, when a delete domain operation occurs on a domain after the grace period, a UPDATE on the DOMAIN table SQL statement is issued by the application. Since a domain can either be in the grace period or not, both these SQL statements cannot be part of the same transaction. Thus, these operations are mutually exclusive and use of both operations will be flagged as an unauthorized transaction.

Figure 8:
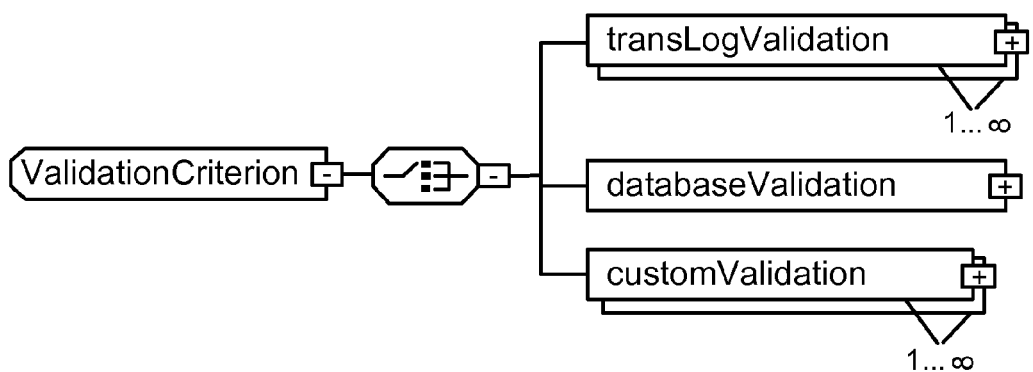
FIG. 8 is a simplified diagram illustrating validation criteria according to an embodiment of the present invention.

FIG. 8 is a simplified diagram illustrating validation criteria according to an embodiment of the present invention. 'ValidationCriterion' captures the validation rules that are applied on the SQL statements and/or the transaction log entries. A validation criterion is defined as a sequence of rules that are either transaction log based validation or database related validation. All validation rules have an 'ignore' attribute which specifies whether the validation rule should be ignored. This will give the ability to selectively turn off validation(s). As illustrated in FIG. 8, there are three kinds of validation rules:

Trans Log Validation: Validating the data in the transaction log with the data in the database.
 Database Validation: Validating the data in the database to ensure that all business rules are properly enforced and the data is persisted as per the customer's intent.
 Custom Validation: Complex validation rules which may be too cumbersome to express in XML can be implemented in code.

Transaction Log Validation

Figure 9:
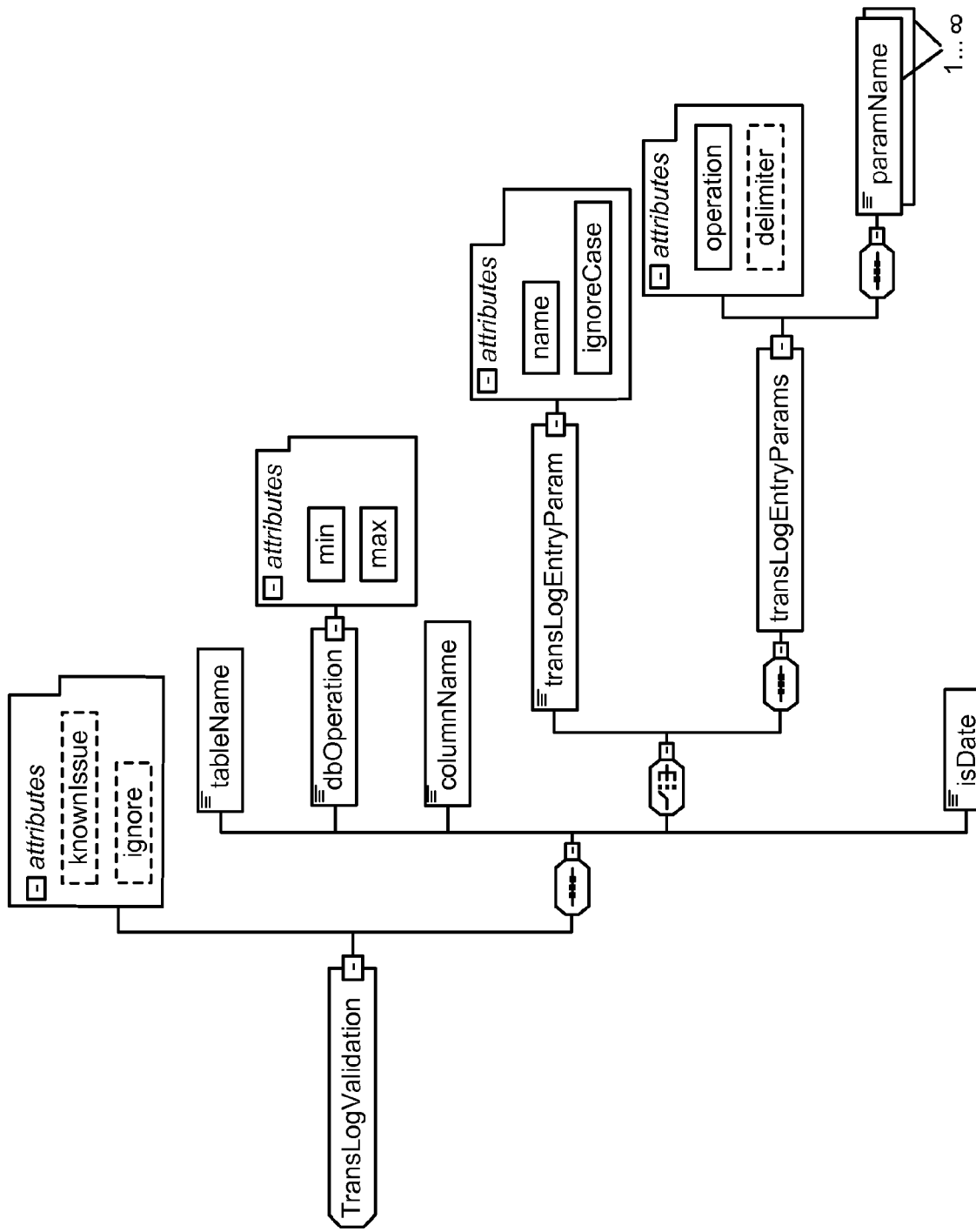
FIG. 9 is a simplified diagram illustrating Transaction Log Validation according to an embodiment of the present invention.

This element captures metadata related to transaction log entry validation. FIG. 9 is a simplified diagram illustrating Transaction Log Validation according to an embodiment of the present invention. A value in the transaction log entry is matched with a value in the SQL summary. In embodiments, the value of a transaction log entry identified by a name must be equal to the value of the column value in a table with the specified database operation. The 'ignoreCase' attribute specifies whether the comparison of the values is case sensitive or not.

In the event a combination of transaction log entries must be concatenated to match a single value in a database column, then the transaction log entry parameters specified by the 'transLogEntryParams' element will be concatenated using the specified delimiter. The resulting value is then compared with a value in a database column.

The knownIssue attribute illustrated in FIG. 9 and other figures specifies whether or not an alert is raised if the validation rule were to fail. The attribute knownIssue can be turned on or off for a number of the different validation rules. If the attribute knownIssue="true," and a validation error were to occur while applying the specified validation rule to the data, then an alert will not be raised. This attribute thus gives the operator the ability to turn off alerts for issues identified in the system, but for which a fix has not yet been implemented. Once the system has been updated to adhere to the validation rule, the attribute knownIssue="false" can be set. Thus, utilizing the knownIssue attribute, noise can be reduced in the system with respect to the errors reported.

As an example of transaction log validation, the following example is applicable to an ADD-DOMAIN operation:

```
<transLogValidation ignore="false">
    <tableName>DOMAIN</tableName>
    <dbOperation max="1" min="1">insert</dbOperation>
    <columnName>DOMAINNAME</columnName>
    <transLogEntryParam name="dm" ignoreCase="true"/>
    <isDate>false</isDate>
</transLogValidation>
```

In this example, the value specified by the transaction log entry with name='dm' will be compared with case insensitivity against the value in the DOMAIN.DOMAINNAME column in the database.

Database Validation

As the SQL statements retrieved from the database reader are parsed into in memory data structures, database validation rules as specified in the associated profile are applied. Thus, any SQL statements that do not match a profile are flagged early in the process.

Figure 10:
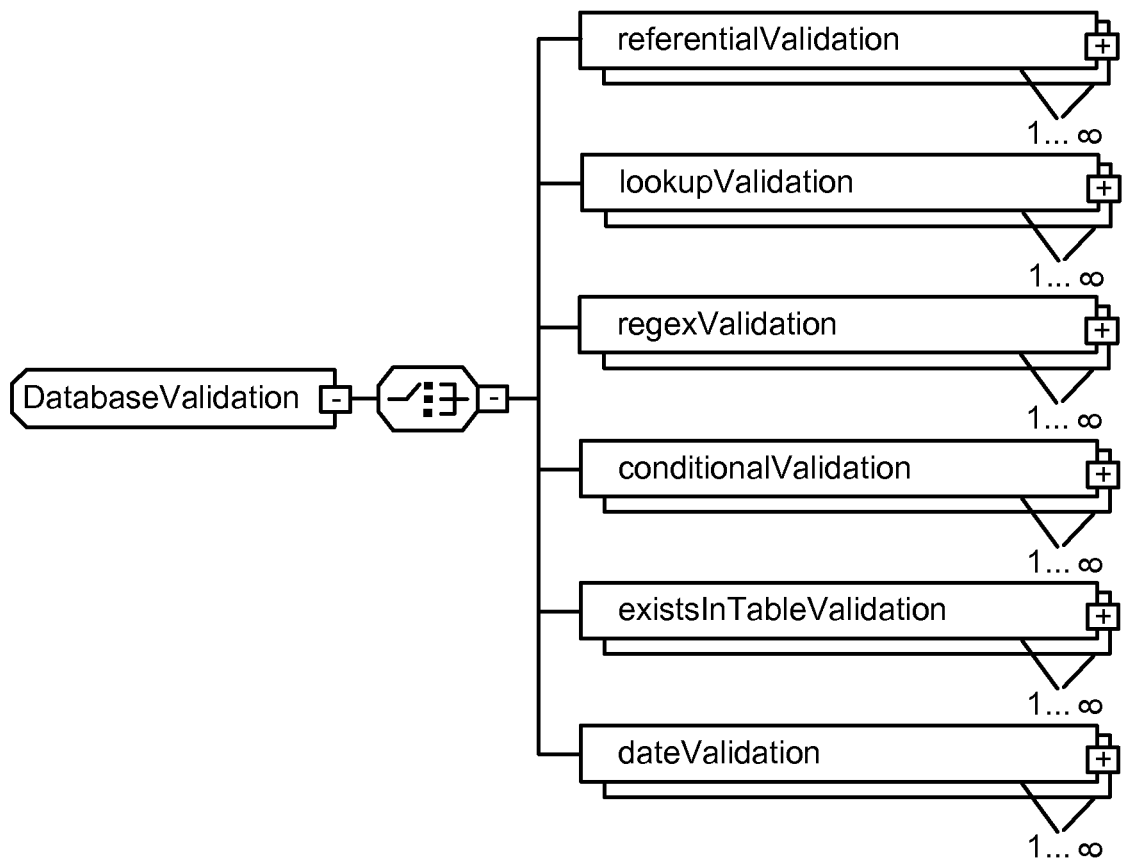
FIG. 10 is a simplified diagram illustrating database validation rules according to an embodiment of the present invention.

FIG. 10 is a simplified diagram illustrating database validation rules according to an embodiment of the present invention. The discussion below provides additional information related to the database validation rules illustrated in FIG. 10.

Referential Validation

Figure 11:
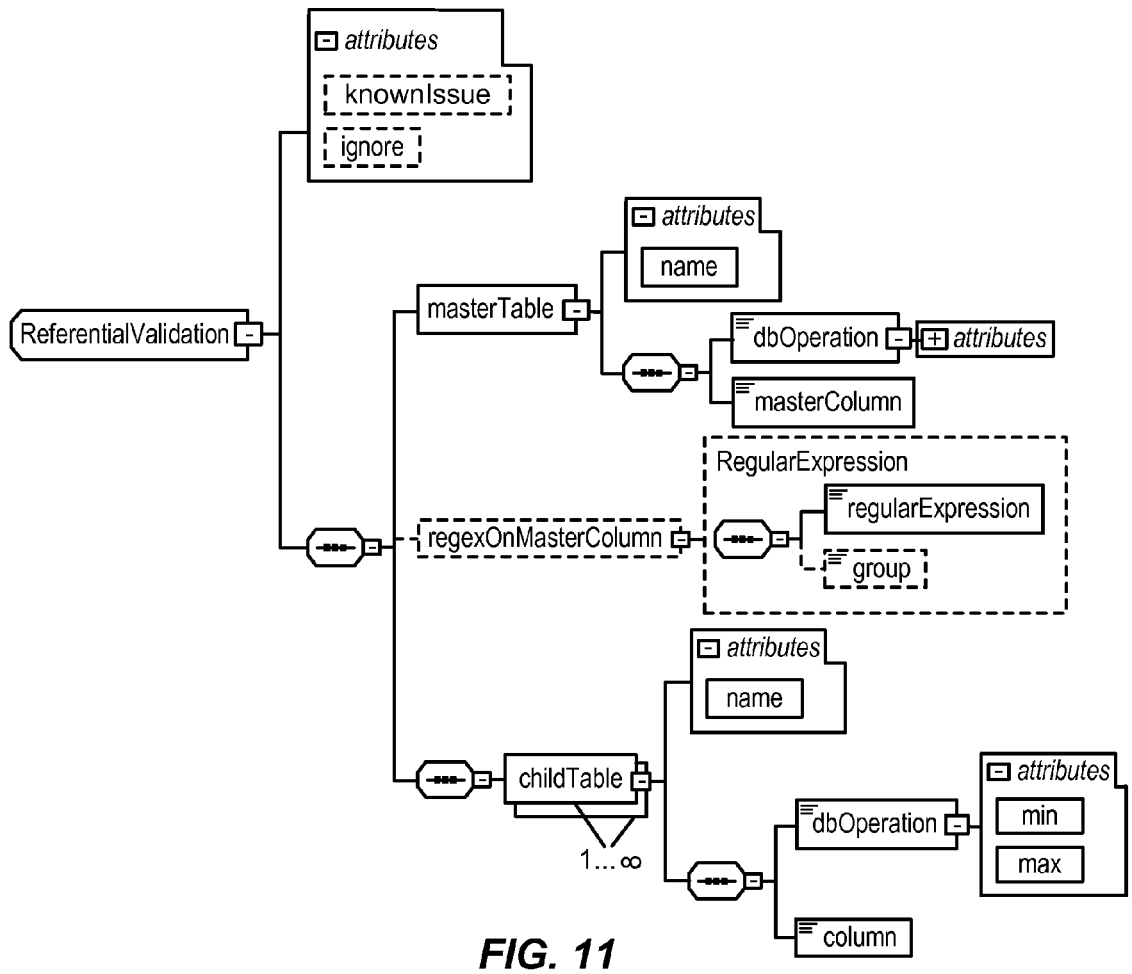
FIG. 11 is a simplified diagram illustrating referential validation according to an embodiment of the present invention.

FIG. 11 is a simplified diagram illustrating referential validation according to an embodiment of the present invention; Referential validation compares the value of a column in the master table to the value of a column in the child table bounded by referential integrity between these tables. After the SQL statements for a given transaction are parsed, referential validation as specified in the profile is performed. In an embodiment, it equates to the following.

[MasterTable.MasterColumn]==[ChildTable.ChildColumn]

An operation can have any number of referential validation rules. Optionally, a regular expression may be applied on the master column prior to it being compared with values in a child column.

As an example of referential validation, the following example from an ADD-DOMAIN profile is provided.

```
<referentialValidation>
    <masterTable name="DOMAIN">
        <dbOperation max="1" min="1">insert</dbOperation>
        <masterColumn>DOMAINNAME</masterColumn>
    </masterTable>
    <regexOnMasterColumn>
        <regularExpression>(.*?)(COM|NET|EDU|ARPA)$</regularExpression>
        <group>2</group>
    </regexOnMasterColumn>
    <childTable name="DOMAIN">
        <dbOperation max="1" min="1">insert</dbOperation>
        <column>PARENTDOMAIN</column>
    </childTable>
</referentialValidation>
```

The above validation rule specifies that the regular expression specified is applied to the value in the DOMAIN.DOMAINNAME column in the database. The resulting value must then be equal to the DOMAIN.PARENTDOMAIN column in the database. Thus, this rule specifies that all domains inserted into the DOMAIN table must end in COM/NET/EDU/ARPA and the corresponding TLD must match the value in the PARENTDOMAIN column.

Lookup Validation

Figure 12:
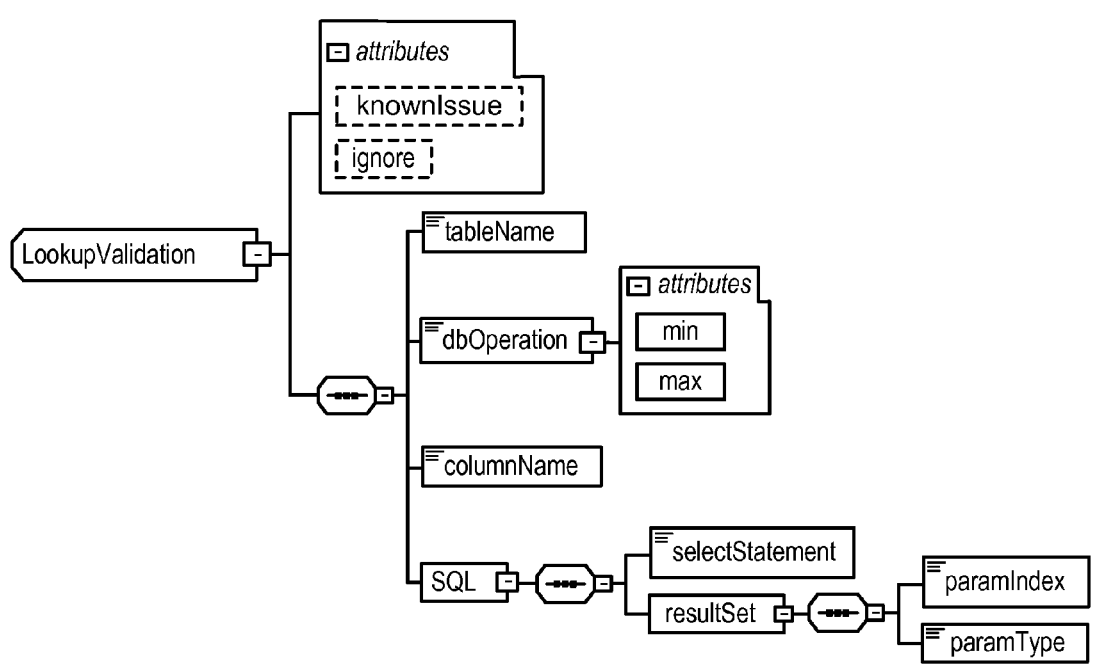
FIG. 12 is a simplified diagram illustrating lookup validation according to an embodiment of the present invention.

A lookup validation is performed to ensure that the value inserted into a column is the right value based on the value in a lookup table. FIG. 12 is a simplified diagram illustrating lookup validation according to an embodiment of the present invention. As illustrated in FIG. 12, the value in the tableName.columnName must be equal to the value returned by executing the specified SQL statement in the profile. This validation rule is optional in some embodiments of the present invention.

Regular Expression Validation

Figure 13:
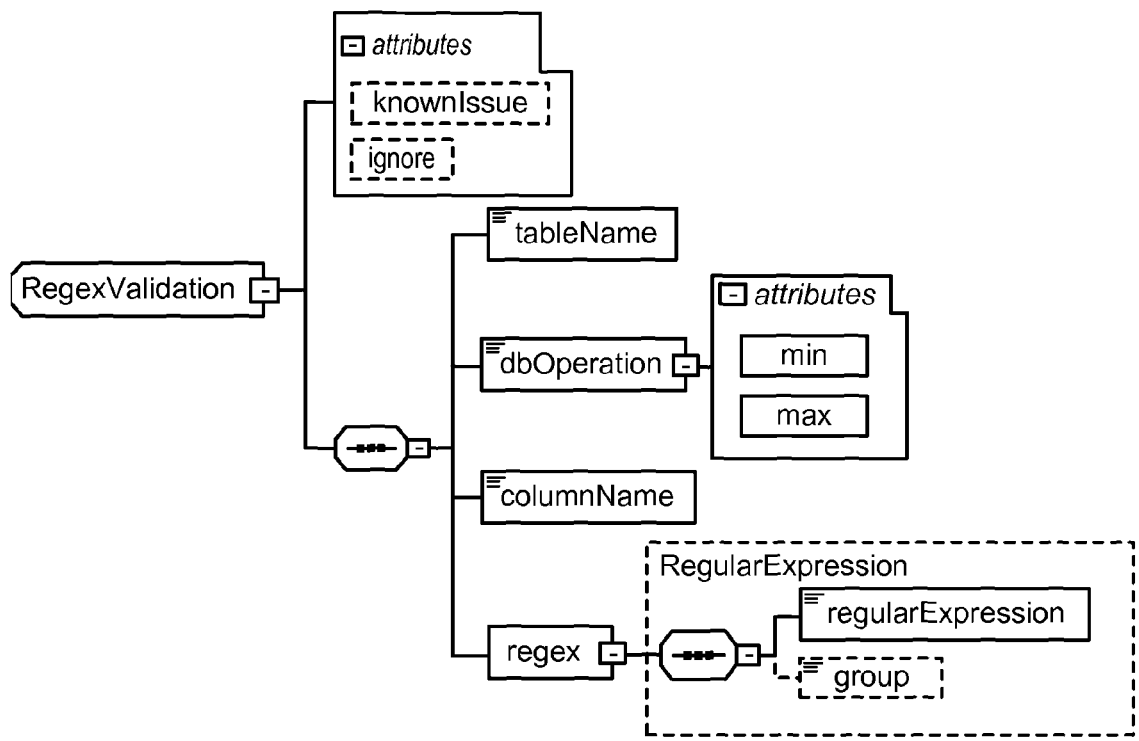
FIG. 13 is a simplified diagram illustrating regular expression validation according to an embodiment of the present invention.

FIG. 13 is a simplified diagram illustrating regular expression validation according to an embodiment of the present invention. Regular expression validation is performed to ensure certain business logic conditions are met. The value in the specified table.column must match the given regular expression. In addition, the specified group that matches the regular expression can be retrieved. Regular expression validation can be done on a stand alone basis or it can be combined with other rules (for example, ExistsInTables validation rule, which is discussed in additional detail below).

Conditional Validation

Figure 14:
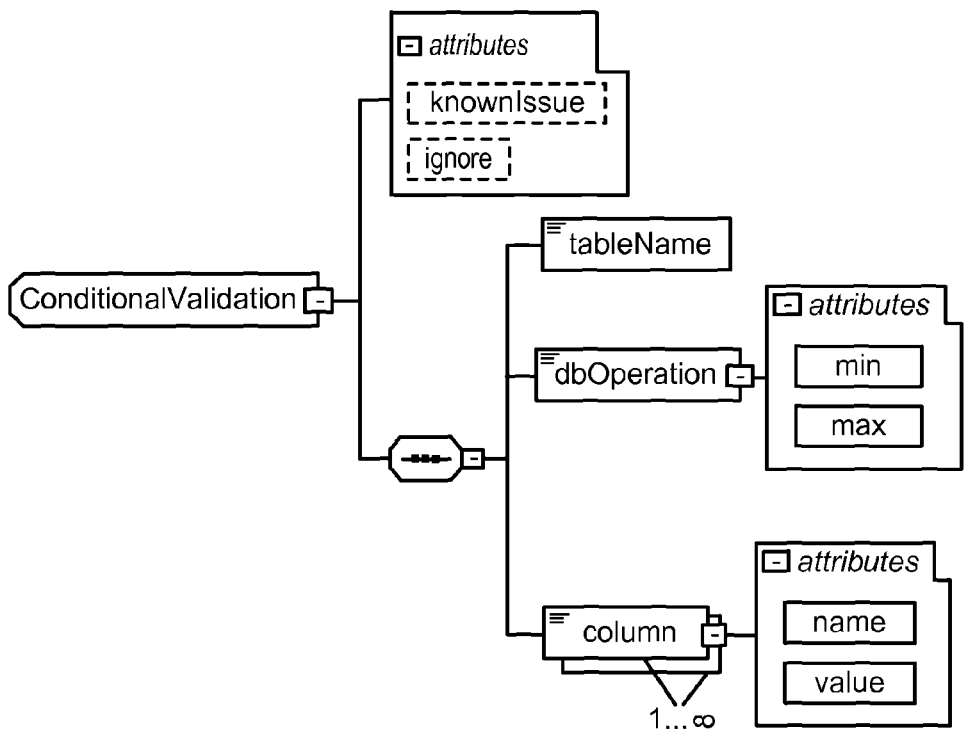
FIG. 14 is a simplified diagram illustrating conditional validation according to an embodiment of the present invention.

FIG. 14 is a simplified diagram illustrating conditional validation according to an embodiment of the present invention. Conditional validation ensures that values inserted into certain columns in the database match exactly as specified in the condition. Conditional validation can be done on a stand alone basis or it can be combined with other rules (for example, ExistsInTables validation rule, which is discussed in additional detail below).

As an example of conditional validation, the following example from an ADD-DOMAIN profile is provided.

```
<conditionalValidation>
    <tableName>TRANSACTIONATTRIBUTES</tableName>
    <dbOperation max="100" min="1">insert</dbOperation>
    <column value="DomainName" name="ATTRIBUTE"></column>
    <column value="RegistrationPeriod" name="ATTRIBUTE">
    </column>
    <column value="Authinfo" name="ATTRIBUTE"></column>
</conditionalValidation>
```

The above example specifies that all the column values specified such as 'DomainName', 'RegistrationPeriod', and the like must have been inserted into the TRANSACTIONATTRIBUTES. ATTRIBUTE column.

Exists in Tables Validation

Figure 15:
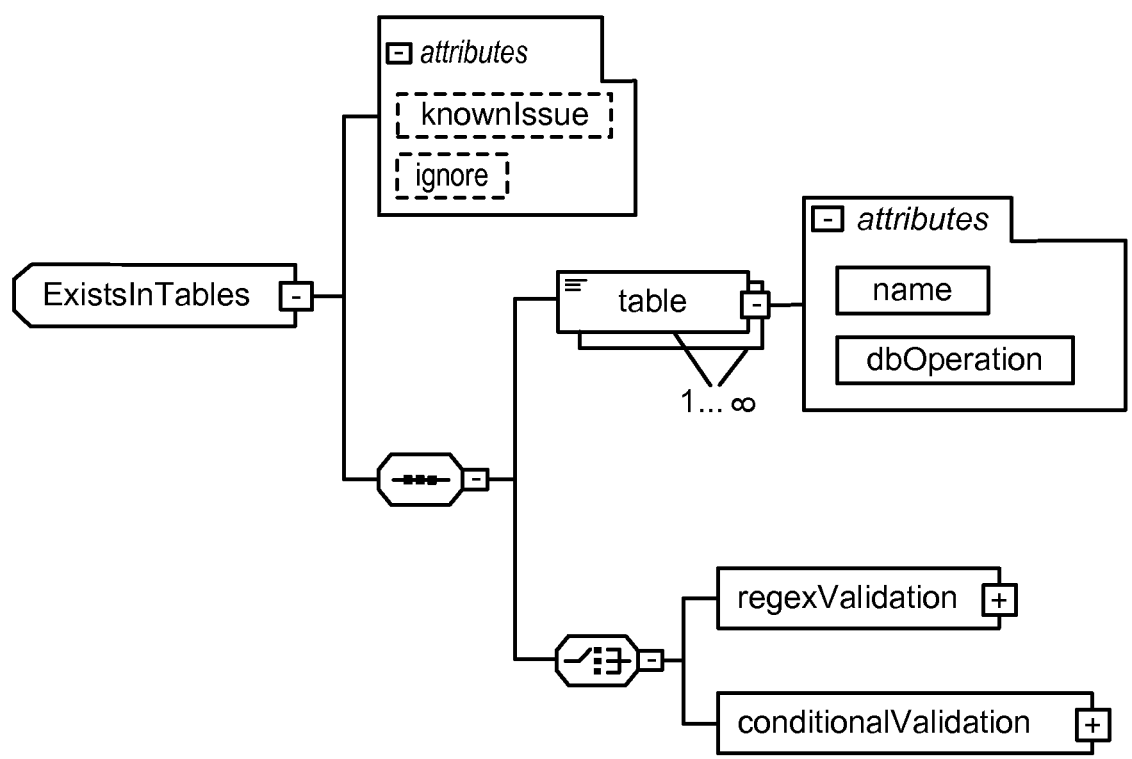
FIG. 15 is a simplified diagram illustrating exists in tables validation according to an embodiment of the present invention.

FIG. 15 is a simplified diagram illustrating exists in tables validation according to an embodiment of the present invention. This validation is performed to ensure certain business logic conditions have been met. For example, if a certain condition is met, then a specified number of operations and types of SQL statements will occur as part of the operation.

Referring to FIGS. 13 and 14, if either the regexValidation or the conditionalValidation specified for the rule is satisfied, then operations on the tables specified must also be part of the operation.

As an example of exists in tables using regular expression validation, the following example from an ADD-DOMAIN profile is provided.

```
<existsInTableValidation>
    <table name="INTERNATIONALDOMAIN"
        dbOperation="insert"/>
    <regexValidation>
        <tableName>DOMAIN</tableName>
        <dbOperation max="1" min="1">insert</dbOperation>
        <columnName>DOMAINNAME</columnName>
        <regex>
            <regularExpression>^XN--.*</regularExpression>
        </regex>
    </regexValidation>
</existsInTableValidation>
```

The above example states that if the value DOMAIN.DOMAINNAME column matches the regular expression '^XN--.*', then an insert into the INTERNATIONALDOMAIN table operation must also exist.

An example of exists in tables validation using conditional validation is:

```
<!-- TRANSFER APPROVE conditional validation-->
<existsInTableValidation>
    <table name="DOMAINPENDINGTRANSFER"
        dbOperation="delete"/>
    <table name="DOMAINPENDINGTRANSFERAUDIT"
        dbOperation="insert"/>
    <table name="DOMAINTRANSFER" dbOperation="insert"/>
    <table name="EMAILQUEUE" dbOperation="insert"/>
    <conditionalValidation>
        <tableName>TRANSACTIONATTRIBUTES</tableName>
        <dbOperation max="100" min="1">insert</dbOperation>
        <column value="Directive" name="ATTRIBUTE"/>
        <column value="1" name="ATTRIBUTEVALUE"/>
    </conditionalValidation>
</existsInTableValidation>
```

The above condition states that if the value inserted into the TRANSACTIONATTRIBUTES. ATTRIBUTE column is equal to 'Directive' AND the value inserted into the ATTRIBUTEVALUE column is '1', then the following SQL operations must also occur.

'delete' operation on the DOMAINPENDINGTRANSFER table

'insert operation on the DOMAINPENDINGTRANSFERAUDIT table

'insert operation on the DOMAINTRANSFER table

'insert operation on the EMAILQUEUE table

Date Validation

Figure 16:
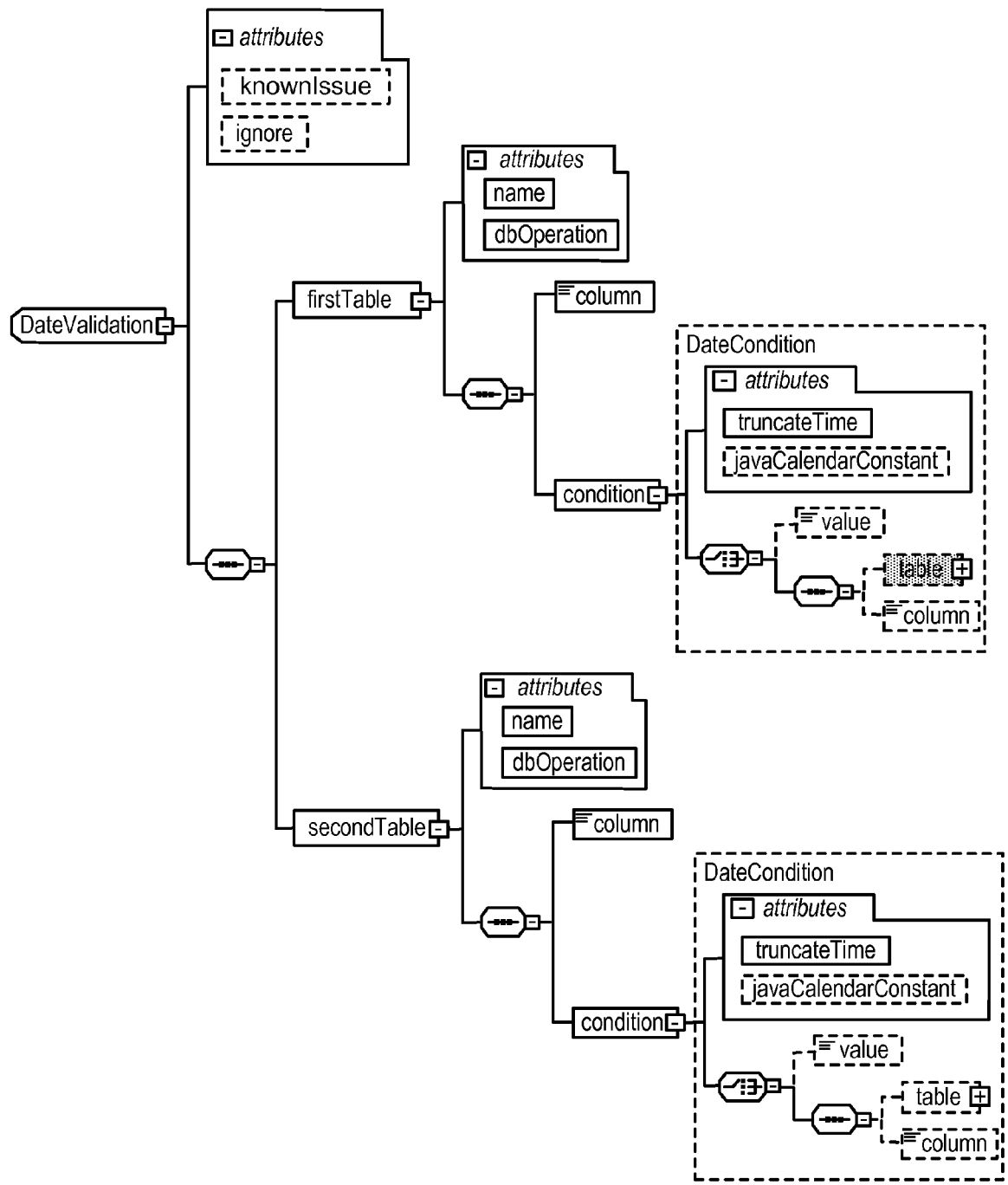
FIG. 16 is a simplified diagram illustrating date validation according to an embodiment of the present invention.

FIG. 16 is a simplified diagram illustrating date validation according to an embodiment of the present invention. Referring to FIG. 16, the date value in the firstTable.column is compared with the secondTable.column after applying the applicable condition(s) as specified by the 'condition' element. The attribute 'truncateTime' is a boolean indicating whether the time portion of the date value should be used for comparison. The 'javaCalendarConstant' refers to the value of the field in the date to be updated as specified in the integer constants of the class java.util.Calendar. The value applied to the date in the column can either be a fixed 'value' as specified by the 'value' element or the value can be the value of another date column in another table (example the REGISTRATIONPERIOD in the DOMAIN table).

As an example of date validation, the following example from an ADD-DOMAIN profile is provided.

```
<dateValidation>
    <firstTable dbOperation="insert" name="DOMAIN">
        <column>CREATEDDATE</column>
        <condition javaCalendarConstant="1" truncateTime="true">
            <value>10</value>
        </condition>
    </firstTable>
    <secondTable dbOperation="insert" name="DOMAIN">
        <column>REGISTRATIONEXPIRATIONDATE</column>
        <condition truncateTime="true"/>
    </secondTable>
</dateValidation>
```

In the above example, we are ensuring that the REGISTRATIONEXPIRATIONDATE value is not more than 10 years from the CREATEDDATE of the domain. Here is the sequence of operations that occur for this validation.

The value in the DOMAIN.CREATEDDATE is parsed to create a java.util.Calendar object.

Since, truncateTime is set to true, the time portion of the date is truncated.

The javaCalendarConstant '1' specifies that the 'YEAR' component of the date.

The value '10' is then applied to the 'YEAR' component of the date effectively creating a date object 10 years from the CREATEDDATE.

The REGISTRATIONEXPIRATIONDATE is created similarly.

Finally, a check is done to ensure that REGISTRATIONEXPIRATIONDATE<=the newly created date object from the CREATEDDATE value.

Custom Validation

Figure 17:
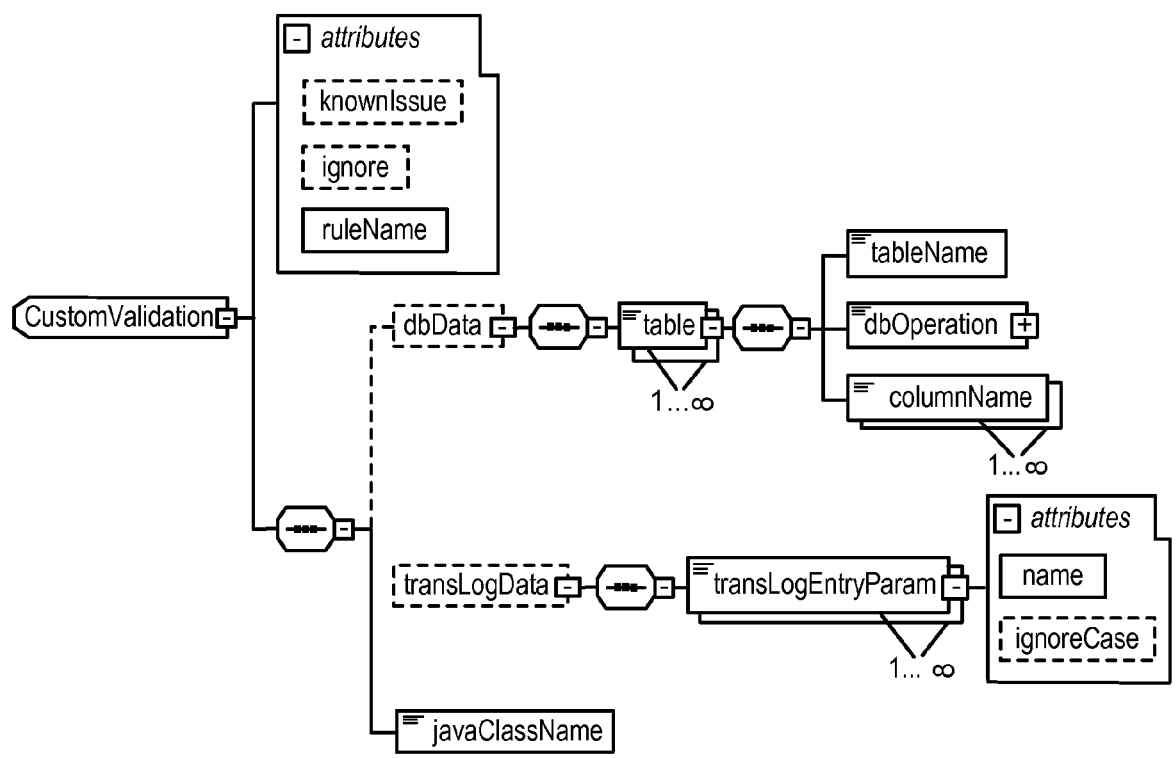
FIG. 17 is a simplified diagram illustrating custom validation according to an embodiment of the present invention.

Certain complex validation rules that are too cumbersome to express in XML are done via custom validation in code. FIG. 17 is a simplified diagram illustrating custom validation according to an embodiment of the present invention. An example of a custom validation rule for the SYNC-DOMAIN operation is shown below:

```
<customValidation ignore="false"
    ruleName="SYNC-DOMAIN: Registration Expiration date validation rule">
    <dbData>
        <table>
            <tableName>DOMAIN</tableName>
            <dbOperation max="1" min="1">UPDATE</dbOperation>
            <columnName>REGISTRATIONEXPIRATIONDATE</columnName>
        </table>
    </dbData>
    <transLogData>
        <transLogEntryParam name="syncDt" ignoreCase="true"/>
    </transLogData>
    <javaClassName>com.verisign.sa.custom.validation.syncdomain.-
SyncDomainExpiration Date
    </javaClassName>
</customValidation>
```

All the validation regarding the registration expiration date is performed in the SyncDomainExpirationDate java class. Some of the validations are:

A domain cannot be synced to February 29.

The value of DOMAIN.REGISTRATIONEXPIRATIONDATE is calculated correctly based on the 'syncDt' parameter written to the transaction log file.

All the custom validation classes are pre-instantiated using Java Reflection API and cached in the CustomValidationCacheManager. All classes that support custom validation must implement the following interface.

```
public interface CustomValidation {
    public void validate ( CustomValidator aCustomValidator,
        SQLSummary aSQLSummary, TransLogSummary
    aTransLogSummary )
        throws CustomValidationException;
}
```

Figure 18:
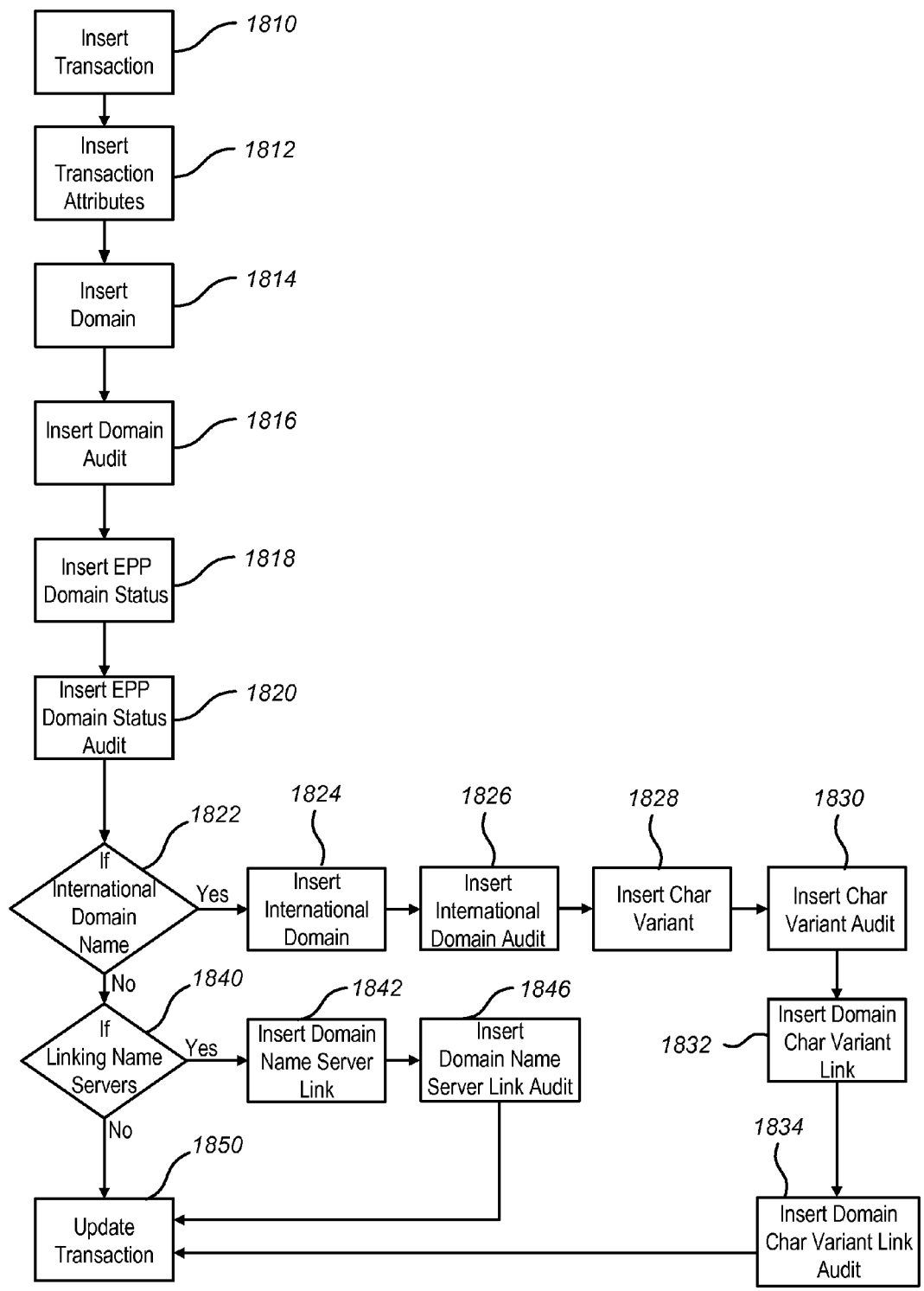
FIG. 18 is a simplified flowchart illustrating a process flow for an add domain operation according to an embodiment of the present invention.

FIG. 18 is a simplified flowchart illustrating a process flow for an add domain operation according to an embodiment of the present invention. The transaction and the transaction attributes are inserted (1810 and 1812). The domain and the domain audit are inserted (1814 and 1816). The EPP domain status and the EPP domain status audit are inserted (1818 and 1820). If the domain name is an international domain name (1822), then a process for international domain names is utilized. The international domain name process includes inserting the international domain and the international domain audit (1824 and 1826). Additionally, the character variants and the character variant audit are inserted for the particular foreign language (1828 and 1830). As part of the international domain name process, the domain character variant link and the domain character variant link audit are inserted (1832 and 1834). After the international domain name process is completed, the transaction is updated (1850).

If the domain name is not an international domain name (1822), then a determination is made if name servers are linked (1840). If the name servers are linked, then the domain name server link and the domain name server link audit are inserted (1842 and 1844). After the domain name server link and the domain name server link audit are inserted, the transaction is updated (1850). If the name servers are not linked, then the transaction is updated (1850).

It should be appreciated that the specific steps illustrated in FIG. 18 provide a particular method of performing an add domain operation according to an embodiment of the present invention. Other sequences of steps may also be performed according to alternative embodiments. For example, alternative embodiments of the present invention may perform the steps outlined above in a different order. Moreover, the individual steps illustrated in FIG. 18 may include multiple sub-steps that may be performed in various sequences as appropriate to the individual step. Furthermore, additional steps may be added or removed depending on the particular applications. One of ordinary skill in the art would recognize many variations, modifications, and alternatives.

There are valid database transactions that occur in the database without a corresponding transaction log entry in a transaction log file. The inventors have identified 43 valid database transactions without a corresponding transaction log entry. Profiles have been created for these 43 database transactions.

A sample of a no transaction log entry profile is shown below:

```
<?xml version="1.0" encoding="UTF-8"?>
<RegistryOperationProfile xmlns="xml.profile.sa.verisign.com">
    <registryOperation>
        <operationInfo>
            <operationID transLogEntryExists="false">-1</operationID>
            <operationName>KNOWN ISSUE</operationName>
            <conceptClassName>KNOWN ISSUE</conceptClassName>
        </operationInfo>
        <databaseInfo>
            <table name="TRANSACTION" optional="false">
                <dbOperation max="1" min="1">UPDATE</dbOperation>
                <column>FILEID</column>
            </table>
        </databaseInfo>
    </registryOperation>
</RegistryOperationProfile>
```

The profile above states the following: When a SQL statement such as 'UPDATE TRANSACTION SET FILEID=<some value>' occurs in a transaction by itself, it is a KNOWN ISSUE as specified by the operationID and conceptClassName tags. Only when the columns specified in the profile are updated will the SQL statement be designated as a known issue. For example, if another column other than the FILEID is updated in the TRANSACTION table, then this is deemed to be a malicious database transaction.

When ProfileManager loads the no transaction log entry profiles, a key is generated in the following form: <TableName1.OperationType (<column 1, column2, ... ), TableName2.OperationType (<column 1, column 2, ... ) ... >

For example, the key generated for the SQL statement for the above profile would be: TRANSACTION.UPDATE (FILEID). This key is then used to cache the associated profile in memory. For every database transaction, the value of the associated OPERATIONID column is retrieved from the SQL statement 'INSERT INTO TRANSACTION' table. When a database transaction is retrieved that does not contain an 'INSERT INTO TRANSACTION' table SQL statement, then a key is generated in the above format. Using this key, the associated profile is then retrieved from the ProfileManager. If the value of the <operationName> tag in the profile is 'KNOWN ISSUE', then this is considered a valid database transaction. If no profile is retrieved with the generated key or if the value of the <operationName> tag is not equal to 'KNOWN ISSUE', then this is deemed to be a malicious database transaction.

Embodiments of the present invention provide a summary has all the information necessary to perform all the specified validations in a profile. All the information received either from the database reader or the application transaction logs is saved as summaries in memory. There are two types of summaries:

SQLSummary—contains parsed relevant information from the database reader. Each transaction in the database is represented as one SQLSummary.

TransLogSummary—contains parsed relevant information from the transaction log. Each line in the transaction log is one distinct TransLogSummary.

Embodiments of the present invention provide an auditable summary. Both the SQL and transaction log summaries extend AuditableSummary. AuditableSummary specifies operations that are common across both the summaries. The 'hasExpired( )' method is invoked to find out if a summary cache entry has expired or not when compared with the maximum SCN retrieved from either the transaction log files or the database.

```
public interface AuditableSummary extends Serializable {
    Date getCreationDate ( );
    boolean hasExpired ( );
    String getTransactionId ( );
    long getSCN ( );
}
```

The hasExpired( ) method ensures that summaries that could not be validated within a specified period of time are deemed to be an error. Since, all summaries are persisted in memory, this safeguard ensures that there is an upper limit on the number of summaries in memory.

Embodiments of the present invention provide an SQL Summary, which is the end product of successfully parsing and validating SQL statements contained within a transaction boundary. The central tenet of SQLSummary is to expose an interface that will be useful for validating transactions in the SRS registry regardless of whether the database reader utilized in the embodiment.

```
public interface SQLSummary extends AuditableSummary {
    int getOperationId ( );
    RegistryOperationProfile getRegistryOperationProfile ( );
    List<String> getColumnValues ( String tableName, String
        operationType, String column, boolean aNewVal );
}
```

Each SQLSummary instance is associated with a registry profile and contains a collection of SQL statements. SQLStatement is the parent interface of a whole hierarchy of interfaces for capturing relevant information from the parsed SQL statement. Specifically, the sub classes of SQLStatement are used to represent information in an 'INSERT/UPDATE/DELETE' SQL statement. SQL summaries are cached in a java.util.LinkedBlockingQueue.

Transaction Log Summary

The TransLogSummary is the end result of successfully parsing a transaction log entry. TransLogSummary is cached keyed by the transaction ID. For each SQLSummary retrieved by the correlator from the SQLSummary cache, the corresponding TransLogSummary is retrieved from the TransLogSummary cache using the transaction ID. The registry profile associated with the SQLSummary is then used to apply transaction log validation rules to the SQL and transaction log summaries.

```
public interface TransLogSummary extends AuditableSummary {
    void setCreationDate ( Date date );
    void setSCN ( long aSCN );
    String getSessionId ( );
    void setSessionId ( String sessionId );
    void addMetadata ( String aValue );
    String getMetadataAtPosition ( int aPosition );
    void addTransLogParam ( TransLogParam aParam );
    TransLogParam getTransLogParamByName ( String aParamName );
    String getConceptClassName ( );
    void setConceptClassName ( String aConceptClassName );
    Collection<TransLogParam> getParams ( );
}
```

Correlator

Correlator threads perform the crucial act of correlating the data in the SQL summary with the data in the transaction log summary. SQL summaries are cached in a java.util.BlockingLinkedQueue. Transaction log summaries are cached in a java.util.HashMap<TransactionID, TransLogSummary>.

On startup, SummaryCorrelator 450 instantiates a specified number of correlator threads. The following sequence of actions takes place in the correlator threads.

The correlator threads wait to be notified to start correlating the data from the SQL and transaction log summary caches.

A SQL summary is retrieved from the SQL summary cache.

A corresponding transaction log summary is attempted to be retrieved from the transaction log summary cache using the transactionID of the SQL summary.

One of two conditions occur:

The corresponding transaction log summary is retrieved.

The corresponding transaction log summary cannot be retrieved from the transaction log summary cache.

In this case, if the SQL summary has not expired based on the creation time stamp in the SQL summary, then the SQL summary is put back into the SQL summary cache.

If the SQL summary has expired, then it is logged as an error and processing continues to the next SQL summary in the cache.

When the corresponding transaction log summary is retrieved, then all transaction log validation rules as specified in the profile are applied across the transaction and SQL summary. The number of successfully correlated summaries is incremented.

Any validation errors are logged.

APE Framework Integration

As discussed previously, the Security Auditor is integrated with the APE Framework. The APE Framework hides the details of the source of the OLTP transaction data. Thus, as far as the Security Auditor is concerned, it is just retrieving OLTP transaction data from an in memory queue in the APE Framework. The APE Framework instantiates the SecurityAuditorFacade via a Spring context. The Spring configuration file 'HostedComponent-config.xml' is included in the SecurityAuditor.

```
<?xml version="1.0" encoding="UTF-8"?>
<beans xmlns=http://www.springframework.org/schema/beans
    xmlns:xsi=http://www.w3.org/2001/XMLSchema-instance
    xsi:schemaLocation="http://www.springframework.org/schema/beans
    http://www.springframework.org/schema/beans/spring-beans.xsd">
    <bean name="hostedComponent"
class="com.verisign.sa.engine.SecurityAuditorFacade">
        <!-- defined in AsyncProcAdapter-conf.xml -->
        <property name="frameworkFacade" ref="frameworkFacade">
        </property>
    </bean>
</beans>
```

The APE Framework's AsyncProcessingEngine will invoke the SecurityAuditorDateRange class to determine the start date time from which point the OLTP transaction data needs to be retrieved from the database reader. The SecurityAuditorDateRange class writes this information to the 'startdate.txt' file. The database reader process is started by passing this start date time. In the configuration file for the database reader process, the java user exit class is set to be the AsyncProcessingEngine class. The AsyncProcessingEngine class will in turn instantiate the SecurityAuditorFacade via the Spring context. SecurityAuditorFacade in turn instantiates SecurityAuditor. Thus, embodiments of the present invention provide for integration between the APE Framework and the SecurityAuditor, which is a hosted component.

As part of the reporting function provided by embodiments of the present invention, all validation errors will be written to log files. Two reports (summary and detail) are generated on a daily basis by the Security Auditor.

Error Log Format

All error logging is done in one place in the SAException class. The format of the error logging is as follows in a particular embodiment:

```
Error: <Error Type>
Sequence Number: <Number of times this error has occurred>
RegOp: <Operation Name>
Transaction ID: <Transaction ID of the offending transaction>
Desc: <Error Message>
```

Depending on how far down the processing the validation exception has occurred, the Operation Name and Transaction ID may not always be present. Sequence number specifies the number of times this exception has occurred in the Security Auditor.

Summary Report

A summary report is generated on a daily basis by the Security Auditor. The summary report contains the types and count of errors that have occurred while auditing the transactions. Statistical information such as the number of records processed, how long it has taken to process them, and the like are also present. The following is an exemplary report that is prepared according to an embodiment of the present invention.

Security Auditor Summary Report
From: 04-15-2009 00:00:00
To: 04-16-2009 00:00:00

The following validation errors have occurred. Please refer to the error log file for details.

---

Inconsistent: Data: 202
Invalid SQL: 6
Unmatched Database Transaction: 744
Total database transactions received: 1,884,051
Total database transactions without transaction table entries: 21,768
Ignored (ABE, SuperDNS, Ignorable tables): 5,801
Unrecognized (possibly malicious): 0
Recognized (with known profiles): 15,967
Total database transactions with transaction table entries: 1,862,283
Ignored (Batches and not one of the 13 EPP operations): 244,659
Unrecognized (possibly malicious) (no profiles): 0
Invalid (possibly malicious): 6
No matching application transaction found (possibly malicious): 744
Unprocessed transactions in cache: 50
Correlation Successful: 1,616,622
Correlation Failed (possibly malicious): 202
Correlation Known Issues: 0
Total application transactions received: 1,666,124
Ignored at start (Only on SA restart): 48,309
Ignored because correlation not needed: 9
No matching database transaction found (possibly malicious): 0
Unprocessed transactions in cache: 982
Correlation Successful: 1,616,622
Correlation Failed (possibly malicious): 202
Correlation Known Issues: 0
Total database transactions with transaction entries ignored because they are known issues: 0
Total correlation failures ignored because they are known issues: 0
Processing time: 0 hour(s) 42 minutes 35 seconds

---

Detail Report

The detail report is generated on a daily basis by the Security Auditor. The number of times a unique error has occurred and details about the error are present in this report. The detail report contains actionable information that can be used by system operators to determine the exact cause of the validation errors. The following is an exemplary detail report prepared according to an embodiment of the present invention.

Security Auditor Detailed Report
From: 04-15-2009 00:00:00
To: 04-16-2009 00:00:00
The following unique validation errors have occurred. Please refer to the error log file for details.

---

~~~~~~~~ Number of occurrences[    4] ~~~~~~~~
Error: Unmatched Database Transaction
RegOp: ADD-NAMESERVER
SQL Summary has expired.
~~~~~~~~~~~~~~~~~~~~~~~~~~~~~~~~~~~~~~~~~~~~~~~
~~~~~~~~ Number of occurrences[    1] ~~~~~~~~
Error: Unmatched Database Transaction
RegOp: DEL-NAMESERVER
SQL Summary has expired.
~~~~~~~~~~~~~~~~~~~~~~~~~~~~~~~~~~~~~~~~~~~~~~~
~~~~~~~~ Number of occurrences[    19] ~~~~~~~~
Error: Unmatched Database Transaction
RegOp: DEL-DOMAIN
SQL Summary has expired.
~~~~~~~~~~~~~~~~~~~~~~~~~~~~~~~~~~~~~~~~~~~~~~~
~~~~~~~~ Number of occurrences[    202] ~~~~~~~~
Error: Unmatched Database Transaction
RegOp: QUIT
SQL Summary has expired.
~~~~~~~~~~~~~~~~~~~~~~~~~~~~~~~~~~~~~~~~~~~~~~~
~~~~~~~~ Number of occurrences[    98] ~~~~~~~~
Error: Inconsistent: Data
RegOp: SESSION
Value in REGISTRYSESSION.[SESSIONID] !=
trans log entry param [N/A]
~~~~~~~~~~~~~~~~~~~~~~~~~~~~~~~~~~~~~~~~~~~~~~~
~~~~~~~~ Number of occurrences[    81] ~~~~~~~~
Error: Unmatched Database Transaction
RegOp: TRANSFER-DOMAIN
SQL Summary has expired.
~~~~~~~~~~~~~~~~~~~~~~~~~~~~~~~~~~~~~~~~~~~~~~~
~~~~~~~~ Number of occurrences[    6] ~~~~~~~~
Error: Invalid SQL
RegOp: RENEW-DOMAIN
Unexpected: DOMAINNAMESERVERLINK.UPDATE
~~~~~~~~~~~~~~~~~~~~~~~~~~~~~~~~~~~~~~~~~~~~~~~
~~~~~~~~ Number of occurrences[    31] ~~~~~~~~
Error: Unmatched Database Transaction
RegOp: RENEW-DOMAIN
SQL Summary has expired.
~~~~~~~~~~~~~~~~~~~~~~~~~~~~~~~~~~~~~~~~~~~~~~~
~~~~~~~~ Number of occurrences[    56] ~~~~~~~~
Error: Unmatched Database Transaction
RegOp: RESTORE-REQUEST
SQL Summary has expired.
~~~~~~~~~~~~~~~~~~~~~~~~~~~~~~~~~~~~~~~~~~~~~~~
~~~~~~~~ Number of occurrences[    102] ~~~~~~~~
Error: Inconsistent: Data
RegOp: QUIT
Value in REGISTRYSESSION.[SESSIONID] !=
trans log entry param [N/A]
~~~~~~~~~~~~~~~~~~~~~~~~~~~~~~~~~~~~~~~~~~~~~~~
~~~~~~~~ Number of occurrences[    18] ~~~~~~~~
Error: Unmatched Database Transaction
RegOp: MOD-NAMESERVER
SQL Summary has expired.
~~~~~~~~~~~~~~~~~~~~~~~~~~~~~~~~~~~~~~~~~~~~~~~
~~~~~~~~ Number of occurrences[    2] ~~~~~~~~
Error: Inconsistent: Data
RegOp: ADD-NAMESERVER
Value in NAMESERVER.[SERVERNAME] !=
trans log entry param [sNm]
~~~~~~~~~~~~~~~~~~~~~~~~~~~~~~~~~~~~~~~~~~~~~~~
~~~~~~~~ Number of occurrences[    65] ~~~~~~~~
Error: Unmatched Database Transaction
RegOp: MOD-DOMAIN
SQL Summary has expired.
~~~~~~~~~~~~~~~~~~~~~~~~~~~~~~~~~~~~~~~~~~~~~~~
~~~~~~~~ Number of occurrences[    48] ~~~~~~~~
Error: Unmatched Database Transaction
RegOp: RESTORE-REPORT
SQL Summary has expired.
~~~~~~~~~~~~~~~~~~~~~~~~~~~~~~~~~~~~~~~~~~~~~~~
~~~~~~~~ Number of occurrences[    219] ~~~~~~~~
Error: Unmatched Database Transaction
RegOp: SESSION
SQL Summary has expired.
~~~~~~~~~~~~~~~~~~~~~~~~~~~~~~~~~~~~~~~~~~~~~~~

Detail Error Log

Embodiments of the present invention provide a detail error log that shares some similarities with the detail report. As each detailed validation error is sent to the DetailReport thread, the thread first logs the message in the detail error log. It then caches the message to be written to the detail report with the count of the number of times the message has been encountered.

The detail error log is written to the logs folder as specified in the Security Auditor configuration file. The name of detail error log is in the following format: sa.err.detail.log.<date>

An example of a sample log is as follows:

---

20091218 112210 INFO Error: Unknown Database Transaction
Desc: TRANSACTION.UPDATE ( SESSIONID )
20091218 112230 INFO Error: Unknown Database Transaction:
Known Issue
RegOp: KNOWN ISSUE
Desc: TRANSACTION.UPDATE ( FILEID )

Verbose Error Log

The verbose error log contains all the details of a validation error. This includes the actual values of the columns in the offending transaction. A system operator could first look into the detail report and if necessary can then look into the verbose error log for more information as required. The verbose error log is written to the logs folder as specified in the Security Auditor configuration file. The name of verbose error log is in the following format: sa.err.<date>

An example of a sample verbose log is as follows:

```
20091216 203918 com.verisign.sa.summary.SQLSummaryUtil ERROR
/*******************************************/
Error: Invalid Database Transaction
Sequence: 1
RegOp: ADD-DOMAIN
TransID: 1299210605
Desc: Expected : [CHARGEDTRANSACTION.INSERT]
/*******************************************/
20091216 203918 com.verisign.sa.summary.SQLSummaryUtil ERROR
/*******************************************/
Error: Invalid Database Transaction
Sequence: 2
RegOp: DEL-DOMAIN
TransID: 1299210606
Desc: Expected: [CHARGEDTRANSACTION.INSERT]
/*******************************************/
20091216 203918 com.verisign.sa.db.processor.util.DBProcessorUtil
ERROR
/*******************************************/
Error: Unknown Database Transaction: Known Issue
Sequence: 1
RegOp: KNOWN ISSUE
Desc: TRANSACTION.UPDATE(
    TRANSACTIONID = 1285208475,
    SESSIONID = -123,
    OPERATIONID = 11,
    REGISTRARID = 50000007,
    TRANSACTIONDATE = 2005-03-16:14:57:29,
    SCN = 57817731432,
    FILEID = -10,
    BLOCKID = null,
    ROWID = AAACuUABQAAAAB8AAA
)
/*******************************************/
```

Monitoring (JMX Management Server)

The Security Auditor will host a management server in some embodiments. As mentioned above, there will be a number of mbeans registered with the management server to provide statistics regarding the status of the Security Auditor and its constituent components.

MBeans

There are multiple mbeans defined in the Security Auditor for monitoring and reporting purposes. There are mbeans that are defined as components in the Security Auditor. Additionally, there are mbeans defined for the configuration information and the Security Auditor itself.

Engine

Key: com.verisign.SecurityAuditor:key1= SecurityAuditor

This mbean has attributes and operations of the Security Auditor. The following attributes are exposed:

Start Date Time String: The start date time for the Security Auditor. The creation timestamp of the transactions being audited is used to determine if the transactions are in the current time frame of the auditing cycle. Typically this is midnight of the day before yesterday.

End Date Time String: The end date time for the Security Auditor. Similar to the start date time, the end date time is used to determine when the auditing cycle needs to be stopped and a report generated. Typically this is midnight of previous day.

Started: This attribute is a boolean variable. A value of true indicates that the Security Auditor is up and running. This can be used by external monitoring components to determine if the Security Auditor is up.

Currently Processing: This attribute is a boolean variable. A value of true indicates that the Security Auditor is currently auditing transactions. This can be used by external monitoring components to determine if the Security Auditor is up.

Configuration

Key: com.verisign.SecurityAuditor:key1=Configuration

Figure 19:
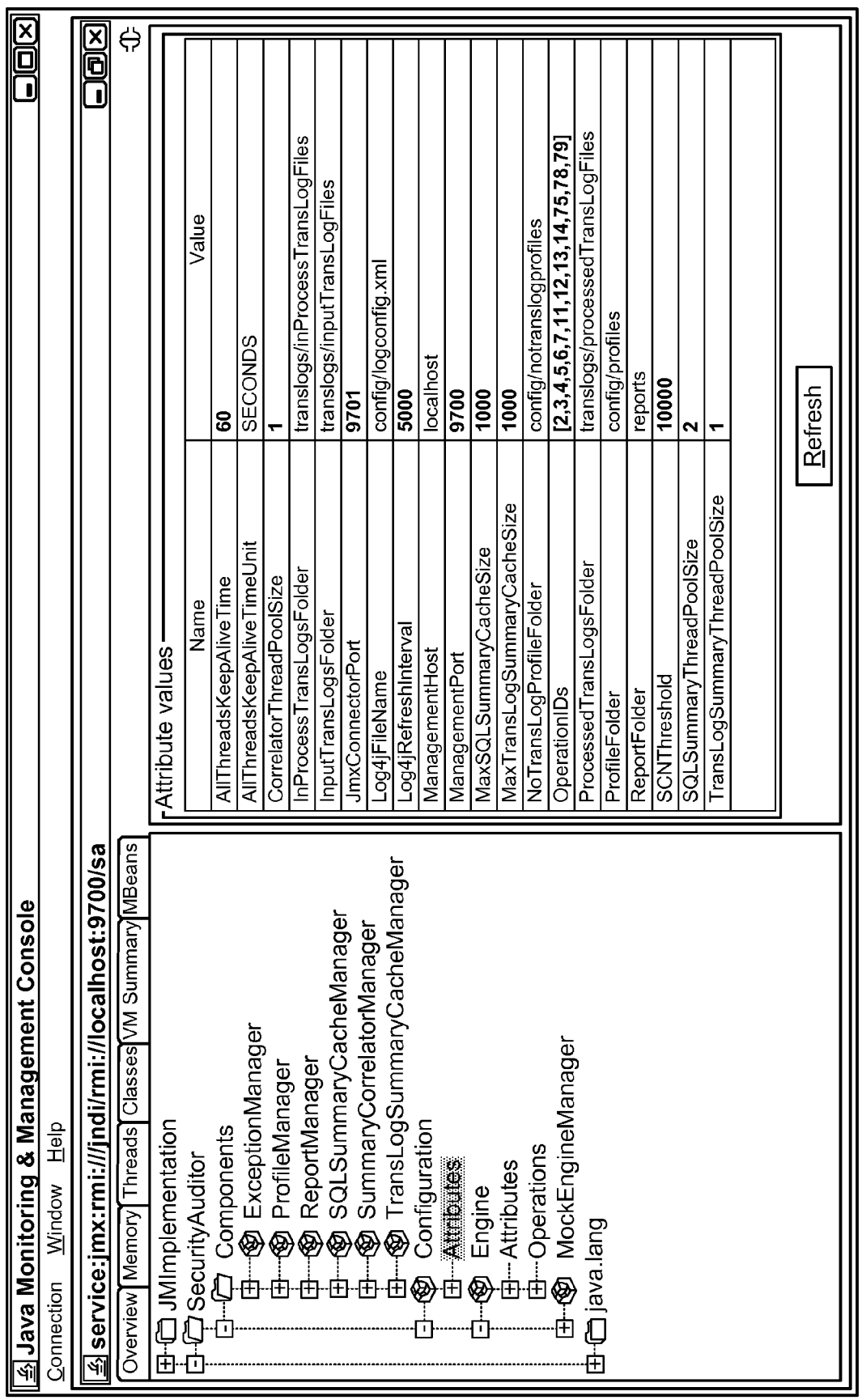
FIG. 19 is a screen shot illustrating configuration information according to an embodiment of the present invention.

The configuration information specified in the configuration file for the Security Auditor is exposed as read only attributes. FIG. 19 is a screen shot illustrating configuration information according to an embodiment of the present invention.

The rest of the Mbeans are defined as components of the Security Auditor. Hence, there is a sub-type associated with the key for the following mbeans.

Exception Manager

Key: com.verisign.SecurityAuditor:key1= ExceptionManager

This mbean defines two operations: Log Error Counts and Display Error Counts. Log Error Counts is an operation that logs the error counts of the validation errors encountered to the error log file. Display Error Counts is an operation that returns a java.lang.String with the same information that was written to the error log file by the logErrorCounts operation. This information could then be displayed in external components such as the Admin Console.

Profile Manager

Key: com.verisign.SecurityAuditor:key1=ProfileManager

Number of Profiles Loaded in Memory: This attribute specifies the number of profiles that have been parsed and loaded into memory by the Profile Manager.

List Profile Operation Names: This operation will return a java.lang.String of the operation names of the profiles in memory. Examples of operation names are ADD-DOMAIN, RESTORE-DOMAIN, and the like.

Reload Profiles: This operation will forcibly reload the profiles on disk into memory. This operation can be used to reload profiles on demand if there were changes to the profiles. Thus, modified profiles can be loaded into memory without shutting down the Security Auditor.

Report Manager

Key: com.verisign.SecurityAuditor:key1=ReportManager

Latest Summary Report: This attribute contains the latest available report of the audited transactions in the Security Auditor. The last summary report generated by the Security Auditor is available via this attribute. This way the latest summary report can be viewed in external components such as the Admin Console.

SQL Summary Cache Manager

Key: com.verisign.SecurityAuditor:key1=SQLSummaryCacheManager

This mbean has statistics regarding the SQL summary cache. The statistics include:

Num Summaries in Cache: This attribute specifies the current size of the valid SQL summaries cache.

Total Valid SQL Summaries: This attribute specifies the total number of valid SQL summaries that were added to the valid SQL summary cache in the current auditing cycle.

Total Invalid SQL Summaries: This attribute specifies the total number of invalid SQL summaries that were added to the invalid SQL summary cache in the current auditing cycle.

Summary Correlator Manager

This mbean has attributes that have information regarding the correlation of transaction and SQL summary caches.

Key: com.verisign.SecurityAuditor:key1= SummaryCorrelatorManager

Last SQL Summary: This attribute specifies the timestamp of the last correlated SQL summary.

Last Trans Log Summary: This attribute specifies the timestamp of the last correlated SQL summary.

Number of Correlated Transactions: This attribute specifies the number of transactions that have been correlated across the SQL and transaction log summary caches.

Trans Log Summary Cache Manager

Key: com.verisign.SecurityAuditor:key1= TransLogSummaryCacheManager

This mbean has statistics regarding the transaction log summary cache.

Num Summaries in Cache: This attribute specifies the current size of the transaction log summary cache.

Total Trans Summaries: This attribute specifies the total number of transaction log summaries that were added to the transaction log summary cache in the current auditing cycle.

Exception Hierarchy

The base class for all exceptions thrown in the Security Auditor is com.verisign.sa.spi.exception.SAException. All other exception classes extend SAException class and are defined in the com.verisign.sa.spi.exception package. The following exception classes (which are provided merely by way of example and are not intended to limit the present invention) will be used for various validation errors according to an embodiment of the present invention:

ConditionalValidationException
CustomValidationException
DatabaseValidationException
DateValidationException
ExistsInTablesException
LookupValidationException
MutuallyExclusiveTablesException
NoProfileFoundException
ProfileException
ReferentialValidationException
RegexValidationException
SQLSummaryExpiredException
SQLParseException
TransLogSummaryExpiredException
TransLogParseException
TransLogValidationException
TransLogSummaryCorrelated-
 WithInvalidSQLSummaryException The base abstract class SAException does all the error logging. According to a particular embodiment, no other logging of validation errors is provided anywhere else in the application.

Recoverability

The Security Auditor writes the start date time from which transactions need to be audited to a file named 'startdate.txt'. In the event of a shut down, Security Auditor will write the timestamp of the last SQLSummary processed to this file. Thus, embodiments provide for restarting the Security Auditor to perform auditing of transactions from where it had left off.

Concurrency

Since embodiments of the present invention provide a Security Auditor that is an in memory validator of registry operations, concurrent execution of operations will typically be utilized. Accordingly, the following concurrent executions take place:

Parsing SQL statements in a transaction and caching of the resulting SQL summaries Multiple transaction log files are processed concurrently.

Data is being correlated between SQL and transaction log summary caches.

Components that utilize a pool of threads will typically use the Executor interface. In addition, the size of the thread pools for each of these components is specified in a configuration file.

```
#=======================================================
# thread pools configuration settings
#=======================================================
sa.all.threadpools.core.size=1
sa.all.threadpools.keepalive.time=60
sa.all.threadpools.keepalive.time.unit=SECONDS
sa.sql.summary.threadpool.size=4
sa.translog.summary.threadpool.size=2
sa.correlator.threadpool.size=2
```

It should be noted that all the thread pools in the Security Auditor will be instantiated with the same ThreadFactory, ThreadGroup and RejectionHandler in an embodiment. Additionally, locks in the Security Auditor will be created using a common LockFactory in order to ensure the same global lock fairness policy for uniformity across the application.

Embodiments of the present invention utilize a number of external libraries, including the Directory Poller. The Directory Poller library provides the ability to monitor specific directories and generate events when files are copied to the directory. On startup, Security Auditor will register TransLogFileDispatcher as a listener with the Directory Poller. When a transaction log file is copied to the directory, Directory Poller picks it up, generates an event and sends the java.io.File object to the TransLogFileDispatcher. This capability of Directory Poller will ensure that when Security Auditor is operating in a real-time auditing mode, the transaction log files can be processed as available.

According to some embodiments, all the interfaces exposed in the SPI model are serializable. This enables the different data components such as caches, summaries, profiles, and the like to be persisted as appropriate based on reasons related to performance, recoverability, or the like.

A profile (written in XML) for an Add Order operation is illustrated below.

```
<?xml version="1.0" encoding="UTF-8"?>
<RegistryOperationProfile xmlns="xml.profile.sa.verisign.com"
xmlns:xsi="http://www.w3.org/2001/XMLSchema-instance"
xsi:schemaLocation="xml.profile.sa.verisign.com
RegistryOperationProfile.xsd">
  <registryOperation>
    <operationInfo>
      <operationID transLogEntryExists="true">2</operationID>
```

```xml
        <operationName>ADD-ORDER</operationName>
        <conceptClassName>RegisterORDEROp</conceptClassName>
    </operationInfo>
    <databaseInfo>
        <table name="TRANSACTION" optional="false">
            <dbOperation max="1" min="1">INSERT</dbOperation>
            <column>TRANSACTIONID</column>
            <column>SESSIONID</column>
            <column allowedValues="2">OPERATIONID</column>
            <column>TRANSACTIONDATE</column>
        </table>
        <table name="TRANSACTION" optional="false">
            <dbOperation max="1" min="1">UPDATE</dbOperation>
            <column>SCN</column>
        </table>
        <table name="TRANSACTIONATTRIBUTES" optional="false" depends="TRANSACTION">
            <dbOperation max="100" min="1">INSERT</dbOperation>
            <column>TRANSACTIONID</column>
            <column>ATTRIBUTE</column>
            <column>ATTRIBUTEVALUE</column>
        </table>
        <table name="ORDER" optional="false" depends="TRANSACTION">
            <dbOperation max="1" min="1">INSERT</dbOperation>
            <column>ORDERID</column>
            <column minLength="2" maxLength="67">ORDERNAME</column>
            <column minValue="1" maxValue="10">REGISTRATIONPERIOD</column>
            <column>ORDEREXPIRATIONDATE</column>
            <column>TRANSACTIONID</column>
            <column minLength="1" maxLength="32">AUTHINFO</column>
            <column>CREATEDDATE</column>
            <column allowedValues="3,14">ENCODINGTYPEID</column>
            <column>PARENTORDER</column>
            <column allowedValues="Y">ZONEINSERTION</column>
        </table>
        <table name="ORDERAUDIT" optional="false" depends="ORDER">
            <dbOperation max="1" min="1">INSERT</dbOperation>
            <column>ORDERID</column>
            <column minLength="2" maxLength="67">ORDERNAME</column>
            <column minValue="1" maxValue="10">REGISTRATIONPERIOD</column>
            <column>ORDEREXPIRATIONDATE</column>
            <column>TRANSACTIONID</column>
            <column minLength="1" maxLength="32">AUTHINFO</column>
            <column>CREATEDDATE</column>
            <column allowedValues="3,14">ENCODINGTYPEID</column>
            <column>PARENTORDER</column>
            <column allowedValues="Y">ZONEINSERTION</column>
            <column>TRANSACTIONDATE</column>
        </table>
        <table name="ORDERSTATUS" optional="false" depends="ORDER">
            <dbOperation max="1" min="1">INSERT</dbOperation>
            <column>ORDERID</column>
            <column allowedValues="1">STATUSCODE</column>
            <column>CREATEDDATE</column>
        </table>
        <table name="ORDERSTATUSAUDIT" optional="false" depends="ORDERSTATUS">
            <dbOperation max="1" min="1">INSERT</dbOperation>
            <column>ORDERID</column>
            <column allowedValues="1">STATUSCODE</column>
            <column>CREATEDDATE</column>
            <column>TRANSACTIONID</column>
        </table>
        <table name="ORDERLINEITEMLINK" optional="true" depends="ORDER">
            <dbOperation max="13" min="1">INSERT</dbOperation>
            <column>TRANSACTIONID</column>
            <column>ORDERID</column>
            <column>LINEITEMID</column>
        </table>
        <table name="ORDERLINEITEMLINKAUDIT" optional="true" depends="ORDERLINEITEMLINK">
            <dbOperation max="13" min="1">INSERT</dbOperation>
            <column>TRANSACTIONID</column>
            <column>ORDERID</column>
            <column>LINEITEMID</column>
        </table>
        <table name="INTERNATIONALORDER" optional="true" depends="ORDER">
            <dbOperation max="1" min="1">INSERT</dbOperation>
```

```xml
        <column>ORDERID</column>
        <column>INTERNATIONALORDERID</column>
        <column allowedValues="1,2,4,6,11,12,13">ENCODINGTYPEID</column>
    </table>
    <table name="INTERNATIONALORDERAUDIT" optional="true" depends="INTERNATIONALORDER">
        <dbOperation max="1" min="1">INSERT</dbOperation>
        <column>ORDERID</column>
        <column>INTERNATIONALORDERID</column>
        <column allowedValues="1,2,4,6,11,12,13">ENCODINGTYPEID</column>
    </table>
    <table name="CHARVARIANT" optional="true">
        <dbOperation max="100" min="1">INSERT</dbOperation>
        <column>VARIANTVALUE</column>
    </table>
    <table name="CHARVARIANTAUDIT" optional="true" depends="CHARVARIANT">
        <dbOperation max="100" min="1">INSERT</dbOperation>
        <column>VARIANTVALUE</column>
    </table>
    <table name="ORDERCHARVARIANTLINK" optional="true" depends="ORDER">
        <dbOperation max="100" min="1">INSERT</dbOperation>
        <column>ORDERID</column>
        <column>VARIANTID</column>
    </table>
    <table name="ORDERCHARVARIANTLINKAUDIT" optional="true" depends="ORDERCHARVARIANTLINK">
        <dbOperation max="100" min="1">INSERT</dbOperation>
        <column>ORDERID</column>
        <column>VARIANTID</column>
    </table>
</databaseInfo>
<validationCriterion>
    <databaseValidation>
        <referentialValidation ignore="false" knownIssue="false">
            <masterTable name="TRANSACTION">
                <dbOperation max="1" min="1">INSERT</dbOperation>
                <masterColumn>TRANSACTIONID</masterColumn>
            </masterTable>
            <childTable name="TRANSACTIONATTRIBUTES">
                <dbOperation max="1" min="1">INSERT</dbOperation>
                <column>TRANSACTIONID</column>
            </childTable>
            <childTable name="ORDER">
                <dbOperation max="1" min="1">INSERT</dbOperation>
                <column>TRANSACTIONID</column>
            </childTable>
            <childTable name="ORDERAUDIT">
                <dbOperation max="1" min="1">INSERT</dbOperation>
                <column>TRANSACTIONID</column>
            </childTable>
            <childTable name="ORDERSTATUSAUDIT">
                <dbOperation max="1" min="1">INSERT</dbOperation>
                <column>TRANSACTIONID</column>
            </childTable>
            <childTable name="ORDERLINEITEMLINK">
                <dbOperation max="1" min="1">INSERT</dbOperation>
                <column>TRANSACTIONID</column>
            </childTable>
            <childTable name="ORDERLINEITEMLINKAUDIT">
                <dbOperation max="1" min="1">INSERT</dbOperation>
                <column>TRANSACTIONID</column>
            </childTable>
        </referentialValidation>
        <referentialValidation ignore="false" knownIssue="false">
            <masterTable name="ORDER">
                <dbOperation max="1" min="1">INSERT</dbOperation>
                <masterColumn>ORDERID</masterColumn>
            </masterTable>
            <childTable name="ORDERAUDIT">
                <dbOperation max="1" min="1">INSERT</dbOperation>
                <column>ORDERID</column>
            </childTable>
            <childTable name="ORDERSTATUS">
                <dbOperation max="1" min="1">INSERT</dbOperation>
                <column>ORDERID</column>
            </childTable>
```

-continued

```xml
            <childTable name="ORDERSTATUSAUDIT">
               <dbOperation max="1" min="1">INSERT</dbOperation>
               <column>ORDERID</column>
            </childTable>
            <childTable name="ORDERCHARVARIANTLINK">
               <dbOperation max="1" min="1">INSERT</dbOperation>
               <column>ORDERID</column>
            </childTable>
            <childTable name="ORDERCHARVARIANTLINKAUDIT">
               <dbOperation max="1" min="1">INSERT</dbOperation>
               <column>ORDERID</column>
            </childTable>
         </referentialValidation>
         <referentialValidation ignore="false" knownIssue="false">
            <masterTable name="ORDER">
               <dbOperation max="1" min="1">INSERT</dbOperation>
               <masterColumn>ORDERNAME</masterColumn>
            </masterTable>
            <childTable name="ORDERAUDIT">
               <dbOperation max="1" min="1">INSERT</dbOperation>
               <column>ORDERNAME</column>
            </childTable>
         </referentialValidation>
         <referentialValidation ignore="false" knownIssue="false">
            <masterTable name="ORDER">
               <dbOperation max="1" min="1">INSERT</dbOperation>
<masterColumn>REGISTRATIONPERIOD</masterColumn>
            </masterTable>
            <childTable name="ORDERAUDIT">
               <dbOperation max="1" min="1">INSERT</dbOperation>
               <column>REGISTRATIONPERIOD</column>
            </childTable>
         </referentialValidation>
         <referentialValidation ignore="false" knownIssue="false">
            <masterTable name="ORDER">
               <dbOperation max="1" min="1">INSERT</dbOperation>
<masterColumn>ORDEREXPIRATIONDATE</masterColumn>
            </masterTable>
            <childTable name="ORDERAUDIT">
               <dbOperation max="1" min="1">INSERT</dbOperation>
               <column>ORDEREXPIRATIONDATE</column>
            </childTable>
         </referentialValidation>
         <referentialValidation ignore="false" knownIssue="false">
            <masterTable name="ORDER">
               <dbOperation max="1" min="1">INSERT</dbOperation>
               <masterColumn>AUTHINFO</masterColumn>
            </masterTable>
            <childTable name="ORDERAUDIT">
               <dbOperation max="1" min="1">INSERT</dbOperation>
               <column>AUTHINFO</column>
            </childTable>
         </referentialValidation>
         <referentialValidation ignore="false" knownIssue="false">
            <masterTable name="ORDER">
               <dbOperation max="1" min="1">INSERT</dbOperation>
               <masterColumn>ENCODINGTYPEID</masterColumn>
            </masterTable>
            <childTable name="ORDERAUDIT">
               <dbOperation max="1" min="1">INSERT</dbOperation>
               <column>ENCODINGTYPEID</column>
            </childTable>
         </referentialValidation>
         <referentialValidation ignore="false" knownIssue="false">
            <masterTable name="ORDER">
               <dbOperation max="1" min="1">INSERT</dbOperation>
               <masterColumn>CREATEDDATE</masterColumn>
            </masterTable>
            <childTable name="ORDERSTATUS">
               <dbOperation max="1" min="1">INSERT</dbOperation>
               <column>CREATEDDATE</column>
            </childTable>
            <childTable name="ORDERSTATUSAUDIT">
               <dbOperation max="1" min="1">INSERT</dbOperation>
               <column>CREATEDDATE</column>
            </childTable>
         </referentialValidation>
         <referentialValidation ignore="false" knownIssue="false">
            <masterTable name="CHARVARIANT">
               <dbOperation max="1" min="1">INSERT</dbOperation>
```

```xml
            <masterColumn>VARIANTVALUE</masterColumn>
          </masterTable>
          <childTable name="CHARVARIANTAUDIT">
            <dbOperation max="1" min="1">INSERT</dbOperation>
            <column>VARIANTVALUE</column>
          </childTable>
        </referentialValidation>
        <referentialValidation ignore="false" knownIssue="false">
          <masterTable name="ORDERCHARVARIANTLINK">
            <dbOperation max="1" min="1">INSERT</dbOperation>
            <masterColumn>VARIANTID</masterColumn>
          </masterTable>
          <childTable name="ORDERCHARVARIANTLINKAUDIT">
            <dbOperation max="1" min="1">INSERT</dbOperation>
            <column>VARIANTID</column>
          </childTable>
        </referentialValidation>
        <referentialValidation ignore="false" knownIssue="false">
          <masterTable name="ORDER">
            <dbOperation max="1" min="1">INSERT</dbOperation>
            <masterColumn>ORDERNAME</masterColumn>
          </masterTable>
          <regexOnMasterColumn>
            <regularExpression>(.*?)(COM|NET|EDU|ARPA)$</regularExpression>
            <group>2</group>
          </regexOnMasterColumn>
          <childTable name="ORDER">
            <dbOperation max="1" min="1">INSERT</dbOperation>
            <column>PARENTORDER</column>
          </childTable>
        </referentialValidation>
      </databaseValidation>
    </validationCriterion>
    <validationCriterion>
      <databaseValidation>
        <conditionalValidation ignore="false" knownIssue="false">
          <tableName>TRANSACTIONATTRIBUTES</tableName>
          <dbOperation max="100" min="1">INSERT</dbOperation>
          <column value="ORDERName" name="ATTRIBUTE"/>
          <column value="RegistrationPeriod" name="ATTRIBUTE"/>
          <column value="Authinfo" name="ATTRIBUTE"/>
        </conditionalValidation>
      </databaseValidation>
    </validationCriterion>
    <validationCriterion>
      <databaseValidation>
        <existsInTableValidation ignore="false" knownIssue="false">
          <table name="INTERNATIONALORDER" dbOperation="INSERT"/>
          <regexValidation>
            <tableName>ORDER</tableName>
            <dbOperation max="1" min="1">INSERT</dbOperation>
            <columnName>ORDERNAME</columnName>
            <regex>
              <regularExpression>^XN--.*</regularExpression>
            </regex>
          </regexValidation>
        </existsInTableValidation>
      </databaseValidation>
    </validationCriterion>
    <validationCriterion>
      <databaseValidation>
        <dateValidation ignore="false" knownIssue="false">
          <firstTable dbOperation="INSERT" name="ORDER">
            <column>CREATEDDATE</column>
            <condition javaCalendarConstant="1" truncateTime="true">
              <value>10</value>
            </condition>
          </firstTable>
          <secondTable dbOperation="INSERT" name="ORDER">
            <column>ORDEREXPIRATIONDATE</column>
            <condition truncateTime="true"/>
          </secondTable>
        </dateValidation>
      </databaseValidation>
    </validationCriterion>
    <validationCriterion>
      <transLogValidation ignore="false" knownIssue="false">
```

-continued

```
            <tableName>TRANSACTION</tableName>
            <dbOperation max="1" min="1">UPDATE</dbOperation>
            <columnName>SCN</columnName>
            <transLogEntryParam name="N/A"/>
        </transLogValidation>
        <transLogValidation ignore="false" knownIssue="true">
            <tableName>ORDER</tableName>
            <dbOperation max="1" min="1">INSERT</dbOperation>
            <columnName>ORDERNAME</columnName>
            <transLogEntryParam name="dm" ignoreCase="true"/>
        </transLogValidation>
        <transLogValidation ignore="false" knownIssue="false">
            <tableName>ORDER</tableName>
            <dbOperation max="1" min="1">INSERT</dbOperation>
            <columnName>REGISTRATIONPERIOD</columnName>
            <transLogEntryParam name="rPd" ignoreCase="true"/>
        </transLogValidation>
        <transLogValidation ignore="false" knownIssue="false">
            <tableName>ORDER</tableName>
            <dbOperation max="1" min="1">INSERT</dbOperation>
            <columnName>AUTHINFO</columnName>
            <transLogEntryParam name="aIn" ignoreCase="false"/>
        </transLogValidation>
      </validationCriterion>
   </registryOperation>
</RegistryOperationProfile>
```

A profile (written in XML) for the Delete Order operation is illustrated below.

```
<?xml version="1.0" encoding="UTF-8"?>
<RegistryOperationProfile xmlns="xml.profile.sa.verisign.com"
xmlns:xsi="http://www.w3.org/2001/XMLSchema-instance"
xsi:schemaLocation="xml.profile.sa.verisign.com
RegistryOperationProfile.xsd">
    <registryOperation>
        <operationInfo>
            <operationID transLogEntryExists="true">4</operationID>
            <operationName>DEL-ORDER</operationName>
            <conceptClassName>DeleteORDEROp</conceptClassName>
        </operationInfo>
        <databaseInfo>
            <table name="TRANSACTION" optional="false">
                <dbOperation max="1" min="1">INSERT</dbOperation>
                <column>TRANSACTIONID</column>
                <column>SESSIONID</column>
                <column allowedValues="4">OPERATIONID</column>
                <column>TRANSACTIONDATE</column>
            </table>
            <table name="TRANSACTION" optional="false">
                <dbOperation max="1" min="1">UPDATE</dbOperation>
                <column>SCN</column>
            </table>
            <table name="TRANSACTIONATTRIBUTES" optional="false"
depends="TRANSACTION">
                <dbOperation max="100" min="1">INSERT</dbOperation>
                <column>TRANSACTIONID</column>
                <column>ATTRIBUTE</column>
                <column>ATTRIBUTEVALUE</column>
            </table>
            <table name="ORDER" optional="true" depends="TRANSACTION">
                <dbOperation max="1" min="1">DELETE</dbOperation>
                <column>ORDERID</column>
                <column>ORDERNAME</column>
                <column>REGISTRARID</column>
                <column>REGISTRATIONPERIOD</column>
                <column>REGISTRATIONEXPIRATIONDATE</column>
                <column>TRANSACTIONID</column>
            </table>
            <table name="ORDER" optional="true" depends="TRANSACTION">
                <dbOperation max="1" min="1">UPDATE</dbOperation>
                <column>ORDERID</column>
                <column>ORDERNAME</column>
                <column>REGISTRARID</column>
                <column>REGISTRATIONPERIOD</column>
```

```xml
        <column>REGISTRATIONEXPIRATIONDATE</column>
        <column>TRANSACTIONID</column>
    </table>
    <table name="ORDERAUDIT" optional="false" depends="ORDER">
        <dbOperation max="1" min="1">INSERT</dbOperation>
        <column>ORDERID</column>
        <column>ORDERNAME</column>
        <column>REGISTRARID</column>
        <column>REGISTRATIONPERIOD</column>
        <column>REGISTRATIONEXPIRATIONDATE</column>
        <column>TRANSACTIONID</column>
    </table>
    <table name="ORDERSTATUS" optional="false" depends="ORDER">
        <dbOperation max="1" min="1">DELETE</dbOperation>
        <column>ORDERID</column>
        <column>STATUSCODE</column>
    </table>
    <table name="ORDERSTATUS" optional="true" depends="ORDER">
        <dbOperation max="1" min="1">INSERT</dbOperation>
        <column>ORDERID</column>
        <column>STATUSCODE</column>
    </table>
    <table name="ORDERSTATUSAUDIT" optional="false"
depends="ORDERSTATUS">
        <dbOperation max="10" min="1">INSERT</dbOperation>
        <column>ORDERID</column>
        <column>STATUSCODE</column>
    </table>
    <table name="LINEITEMSTATUS" optional="true" depends="LINEITEM">
        <dbOperation max="1" min="1">DELETE</dbOperation>
        <column>LINEITEMID</column>
        <column>STATUSCODE</column>
    </table>
    <table name="LINEITEMSTATUSAUDIT" optional="true"
depends="LINEITEMSTATUS">
        <dbOperation max="10" min="1">INSERT</dbOperation>
        <column>LINEITEMID</column>
        <column>STATUSCODE</column>
    </table>
    <table name="LINEITEM" optional="true" depends="ORDER">
        <dbOperation max="1" min="1">DELETE</dbOperation>
        <column>TRANSACTIONID</column>
        <column>LINEITEMID</column>
    </table>
    <table name="LINEITEMAUDIT" optional="true" depends="ORDER">
        <dbOperation max="1" min="1">INSERT</dbOperation>
        <column>LINEITEMID</column>
        <column>SERVERNAME</column>
        <column>TRANSACTIONID</column>
        <column>TRANSACTIONDATE</column>
    </table>
    <table name="ORDERLINEITEMLINK" optional="true" depends="ORDER">
        <dbOperation max="1" min="1">DELETE</dbOperation>
        <column>TRANSACTIONID</column>
        <column>ORDERID</column>
        <column>LINEITEMID</column>
    </table>
    <table name="ORDERLINEITEMLINKAUDIT" optional="true"
depends="ORDER">
        <dbOperation max="1" min="1">INSERT</dbOperation>
        <column>TRANSACTIONID</column>
        <column>ORDERID</column>
        <column>LINEITEMID</column>
    </table>
    <table name="INTERNATIONALORDER" optional="true" depends="ORDER">
        <dbOperation max="1" min="1">DELETE</dbOperation>
        <column>ORDERID</column>
        <column>INTERNATIONALORDERID</column>
    </table>
    <table name="INTERNATIONALORDERAUDIT" optional="true"
depends="INTERNATIONALORDER">
        <dbOperation max="1" min="1">INSERT</dbOperation>
        <column>ORDERID</column>
        <column>INTERNATIONALORDERID</column>
        <column allowedValues="1,2,4,6,11,12,13">ENCODINGTYPEID</column>
    </table>
    <table name="INTERNATIONALLINEITEM" optional="true"
depends="INTERNATIONALORDER">
        <dbOperation max="1" min="1">DELETE</dbOperation>
```

-continued

```xml
            <column>INTERNATIONALLINEITEMID</column>
        </table>
        <table name="INTERNATIONALLINEITEMAUDIT" optional="true"
depends="INTERNATIONALORDER">
            <dbOperation max="1" min="1">INSERT</dbOperation>
            <column>TRANSACTIONID</column>
            <column
allowedValues="1,2,4,6,11,12,13">ENCODINGTYPEID</column>
        </table>
        <table name="CHARVARIANT" optional="true">
            <dbOperation max="1" min="1">DELETE</dbOperation>
            <column>VARIANTID</column>
        </table>
        <table name="CHARVARIANTAUDIT" optional="true"
depends="CHARVARIANT">
            <dbOperation max="1" min="1">INSERT</dbOperation>
            <column>TRANSACTIONID</column>
            <column>TRANSACTIONDATE</column>
            <column>VARIANTID</column>
        </table>
        <table name="ORDERCHARVARIANTLINK" optional="true">
            <dbOperation max="1" min="1">DELETE</dbOperation>
            <column>ORDERID</column>
            <column>VARIANTID</column>
        </table>
        <table name="ORDERCHARVARIANTLINKAUDIT" optional="true"
depends="ORDERCHARVARIANTLINK">
            <dbOperation max="1" min="1">INSERT</dbOperation>
            <column>TRANSACTIONID</column>
            <column>TRANSACTIONDATE</column>
            <column>ORDERID</column>
            <column>VARIANTID</column>
        </table>
        <table name="COMPONENT" optional="true" depends="LINEITEM">
            <dbOperation max="13" min="1">DELETE</dbOperation>
            <column>COMPONENT</column>
        </table>
        <table name="COMPONENTAUDIT" optional="true" depends="COMPONENT">
            <dbOperation max="13" min="1">INSERT</dbOperation>
            <column>COMPONENT</column>
            <column>TRANSACTIONID</column>
            <column>TRANSACTIONDATE</column>
        </table>
        <table name="LINEITEMCOMPONENTLINK" optional="true"
depends="LINEITEM">
            <dbOperation max="13" min="1">DELETE</dbOperation>
            <column>COMPONENT</column>
            <column>LINEITEMID</column>
        </table>
        <table name="LINEITEMCOMPONENTLINKAUDIT" optional="true"
depends="LINEITEMCOMPONENTLINK">
            <dbOperation max="13" min="1">INSERT</dbOperation>
            <column>COMPONENT</column>
            <column>TRANSACTIONID</column>
            <column>TRANSACTIONDATE</column>
        </table>
        <table name="ORDERTRACKING" optional="true" depends="ORDER">
            <dbOperation max="1" min="1">DELETE</dbOperation>
            <column>TRANSACTIONID</column>
            <column>OPERATIONID</column>
            <column>ORDERID</column>
            <column>CREATEDDATE</column>
        </table>
        <mutuallyExclusive>
            <table name="ORDER" dbOperation="UPDATE"/>
            <table name="ORDER" dbOperation="DELETE"/>
        </mutuallyExclusive>
    </databaseInfo>
    <validationCriterion>
        <databaseValidation>
            <referentialValidation ignore="false" knownIssue="false">
                <masterTable name="TRANSACTION">
                    <dbOperation max="1" min="1">INSERT</dbOperation>
                    <masterColumn>TRANSACTIONID</masterColumn>
                </masterTable>
                <childTable name="TRANSACTIONATTRIBUTES">
                    <dbOperation max="1" min="1">INSERT</dbOperation>
                    <column>TRANSACTIONID</column>
                </childTable>
                <childTable name="ORDERAUDIT">
```

```xml
            <dbOperation max="1" min="1">INSERT</dbOperation>
            <column>TRANSACTIONID</column>
          </childTable>
        </referentialValidation>
      </databaseValidation>
    </validationCriterion>
    <validationCriterion>
      <transLogValidation ignore="false" knownIssue="false">
        <tableName>TRANSACTION</tableName>
        <dbOperation max="1" min="1">UPDATE</dbOperation>
        <columnName>SCN</columnName>
        <transLogEntryParam name="N/A"/>
      </transLogValidation>
      <transLogValidation ignore="false" knownIssue="true">
        <tableName>ORDER</tableName>
        <dbOperation max="1" min="1">DELETE</dbOperation>
        <columnName>ORDERNAME</columnName>
        <transLogEntryParam name="dm" ignoreCase="true/">
      </transLogValidation>
    </validationCriterion>
  </registryOperation>
</RegistryOperationProfile>
```

Based on the profiles discussed above, the steps of the various operations are validated for the appropriate transactions stored in the OLTP database in one embodiment. Since the profile demonstrates how the operations for writing data to the database should proceed, if the data is not written in this exact format, the security auditor will flag the transaction for further investigation and/or reporting. A similar syntax is used for mapping application transaction logs to database transaction logs to establish a chain of custody from the application servers to the database.

Figure 20:
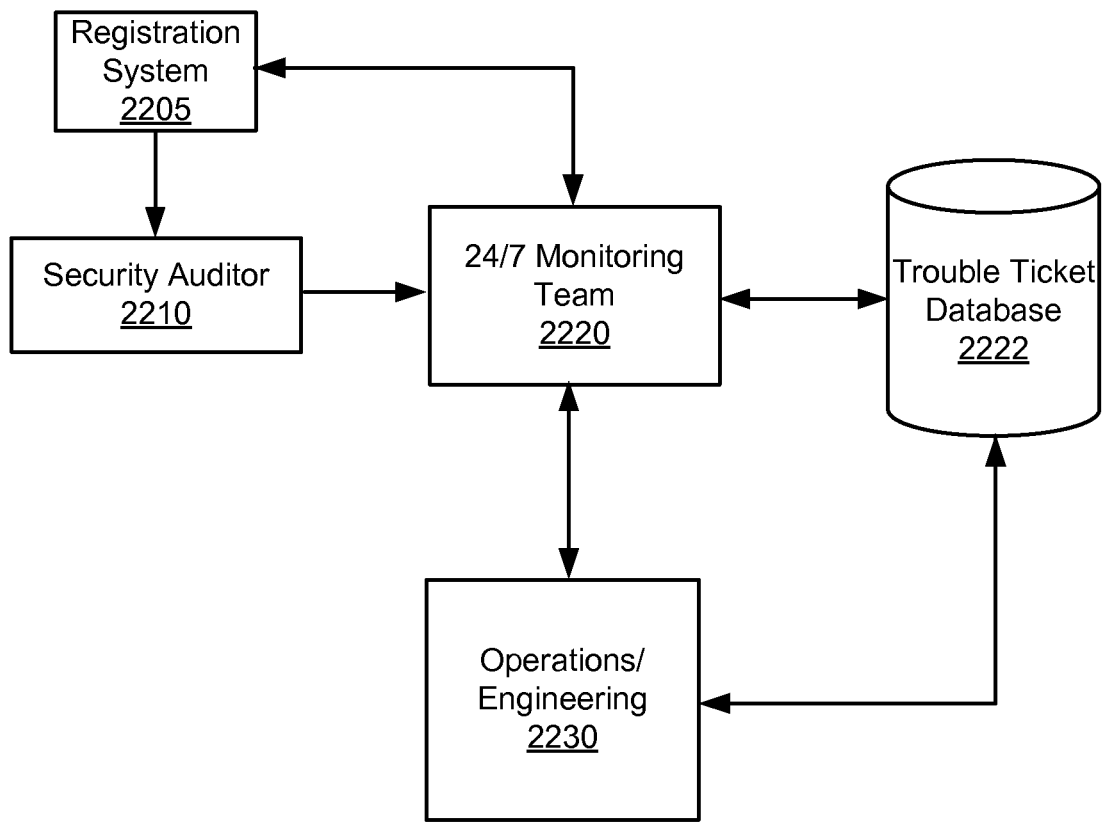
FIG. 20 is a simplified block diagram for a system to report results from the Security Auditor according to an embodiment of the present invention.

FIG. 20 is a simplified block diagram for a system to report results from the Security Auditor according to an embodiment of the present invention. Data from registration system 2205 is provided to the security auditor 2210. In an embodiment, the data from the registration system can be provided by registrars, which register domain names for registrants. Additional discussion of registration data and storing of such data in databases is provided throughout the present specification. The security auditor 2210 processes the data from the registration system 2205 and if anomalies are detected, then a notification is provided to the 24/7 monitoring team 2220. The notifications can take the form of the detail and summary reports described herein or other notification methods.

The 24/7 monitoring team 2220 generates trouble tickets, which may be stored in trouble ticket database 2222. The trouble ticket database 2222 can be co-located with the 24/7 monitoring team of may be remotely located depending on system implementation. Information related to the reporting from the security auditor 2210 is passed to the Operations/Engineering team 2230 by the 24/7 monitoring team. The information can be passed automatically or after review by the 24/7 monitoring team. In some embodiments, the trouble tickets generated by the 24/7 monitoring team are utilized to provide inputs and notifications to the Operations/Engineering team 2230. As illustrated, the Operations/Engineering team has access to the trouble ticket database 2222. Depending on the nature of the issue detected by the security auditor, appropriate action is taken, which can include updates to the security auditor 2210, updates to the registration system 2205, for example, by communicating with a registrar, or the like.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method, implemented by a processor, for validating Shared Registration System (SRS) registry transaction data, the method comprising:
   receiving, by the processor, online transaction processing (OLTP) transaction data associated with an SRS registry database, wherein the transaction data is associated with SRS registry operations comprising at least one of: adding an Internet domain name, deleting an Internet domain name, renewing an Internet domain name, modifying an Internet domain name, restoring an Internet domain name, transferring an Internet domain name, adding an Internet domain name server, deleting an Internet domain name server, or modifying an Internet domain name server;
   parsing, by the processor, the OLTP transaction data;
   comparing, by the processor, the parsed OLTP transaction data to one or more profiles, the profiles comprising metadata describing one or more SRS registry operations, wherein each profile corresponds to at least one known SRS registry operation associated with a known code path, wherein an alert is generated if an OLTP transaction does not match at least one of the one or more profiles;
   receiving, by the processor, log data associated with the OLTP transaction data;
   parsing, by the processor, the log data associated with the OLTP transaction data; and
   verifying, by the processor, that transactions represented by the OLTP transaction data came from a known source by correlating the parsed OLTP transaction data with the parsed log data,
   wherein a chain of custody is established if the parsed OLTP transaction data correlates with the parsed log data, and
   wherein an alert is generated if the parsed OLTP transaction data does not correlate with the parsed log data, indicating that at least one transaction represented by the OLTP transaction data did not come from a known source.

2. The method of claim 1 wherein generating an alert comprises generating at least one summary report.

3. The method of claim 2 wherein the at least one summary report comprises a detail report.

4. The method of claim 1 wherein the SRS registry database comprises a domain name registry database.

5. The method of claim 1 wherein the one or more profiles include profiles for at least one of adding a domain name, deleting a domain name, or renewing a domain name.

6. The method of claim 1 wherein the one or more profiles include profiles for at least one of adding a domain name server, deleting a domain name server, or modifying a domain name server.

7. A non-transitory computer-readable medium, for validating transaction data associated with a Shared Registration Registry (SRS) registry, the medium including instructions that when executed by a processor cause the processor to perform operations comprising:
 receiving, by the processor, online transaction processing (OLTP) associated with an SRS registry, wherein the transaction data is associated with SRS registry operations comprising at least one of: adding an Internet domain name, deleting an Internet domain name, renewing an Internet domain name, modifying an Internet domain name, restoring an Internet domain name, transferring an Internet domain name, adding an Internet domain name server, deleting an Internet domain name server, or modifying an Internet domain name server;
 parsing, by the processor, the OLTP transaction data;
 comparing, by the processor, the parsed OLTP transaction data to one or more profiles, the profiles comprising metadata describing one or more SRS registry operations, wherein each profile corresponds to at least one known SRS registry operation associated with a known code path, wherein an alert is generated if a transaction does not match at least one of the one or more profiles;
 receiving, by the processor, log data associated with the OLTP transaction data;
 parsing, by the processor, the log data associated with the OLTP transaction data; and
 verifying, by the processor, that transactions represented by the OLTP transaction data came from a known source by correlating the parsed OLTP transaction data with the parsed log data,
 wherein a chain of custody is established if the parsed transaction data correlates with the parsed log data, and
 wherein an alert is generated if the parsed transaction data does not correlate with the parsed log data, indicating that at least one transaction represented by the transaction data did not come from a known source.

8. The non-transitory computer-readable medium of claim 7 wherein the metadata is provided in an XML file.

9. The non-transitory computer-readable medium of claim 7, the operations further comprising caching the parsed OLTP transaction data prior to correlating the parsed transaction data with the log data.

10. The non-transitory computer-readable medium of claim 7, the operations further comprising caching the log data prior to correlating the parsed OLTP transaction data with the log data.

11. The non-transitory computer-readable medium of claim 7, the operations further comprising determining a validation error.

12. The non-transitory computer-readable medium of claim 7, the operations further comprising providing at least one report.

13. A system for validating transaction data associated with a Shared Registration System (SRS) registry database with transaction log files stored in a transaction log database, the system comprising:
 a processor; and
 a memory communicatively connected to the processor and storing instructions executable by the processor to perform functions of:
 a database reader operable to receive online transaction processing (OLTP) transaction data from the SRS registry database and parse the OLTP transaction data, wherein the transaction data is associated with SRS registry operations comprising at least one of: adding an Internet domain name, deleting an Internet domain name, renewing an Internet domain name, modifying an Internet domain name, restoring an Internet domain name, transferring an Internet domain name, adding an Internet domain name server, deleting an Internet domain name server, or modifying an Internet domain name server;
 a database data validator coupled to the database reader and operable to compare the parsed OLTP transaction data with one or more profiles, the profiles comprising metadata describing one or more SRS registry operations, wherein each profile corresponds to at least one known SRS registry operation associated with a known code path, wherein an alert is generated if an OLTP transaction does not match at least one of the one or more profiles;
 a transaction log file reader operable to receive a transaction log file from the transaction log database;
 a transaction log file parser coupled to the transaction log file reader to parse the received transaction log file; and
 a data correlator coupled to the database data validator and the transaction log file reader and operable to verify that transactions represented by the OLTP transaction data came from a known source by correlating the parsed OLTP transaction data with the parsed transaction log file,
 wherein a chain of custody is established if the parsed OLTP transaction data correlates with the parsed transaction log file, and
 wherein an alert is generated if the parsed OLTP transaction data does not correlate with the parsed transaction log file, indicating that at least one transaction represented by the OLTP transaction data did not come from a known source.

14. The system of claim 13 wherein the metadata is provided in XML files.

15. The system of claim 13 further comprising a first data cache coupled to the database data validator.

16. The system of claim 13 further comprising a second data cache coupled to the transaction log file reader.

17. The system of claim 13 further comprising a report generator coupled to the data correlator.

* * * * *